(12) United States Patent
Solichien

(10) Patent No.: US 11,581,911 B2
(45) Date of Patent: Feb. 14, 2023

(54) APPARATUS AND METHODS FOR PHASE NOISE MITIGATION IN WIRELESS SYSTEMS

(71) Applicant: Charter Communications Operating, LLC, St. Louis, MO (US)

(72) Inventor: Yohannes S. Solichien, St. Louis, MO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 10 days.

(21) Appl. No.: 16/666,255

(22) Filed: Oct. 28, 2019

(65) Prior Publication Data

US 2021/0126662 A1   Apr. 29, 2021

(51) Int. Cl.
| | |
|---|---|
| H04L 12/28 | (2006.01) |
| H04B 1/12 | (2006.01) |
| H04L 25/02 | (2006.01) |
| H04L 25/03 | (2006.01) |
| H04L 1/00 | (2006.01) |

(52) U.S. Cl.
CPC .......... H04B 1/123 (2013.01); H04L 1/0003 (2013.01); H04L 25/0256 (2013.01); H04L 25/0328 (2013.01)

(58) Field of Classification Search
CPC ..................................................... H04L 12/28
USPC ........................................................ 370/329
See application file for complete search history.

(56) References Cited

U.S. PATENT DOCUMENTS

| | | | |
|---|---|---|---|
| 5,991,308 | A | 11/1999 | Fuhrmann et al. |
| 5,995,499 | A | 11/1999 | Hottinen et al. |
| 6,154,648 | A | 11/2000 | Comer |
| 6,356,560 | B1 | 3/2002 | Venters et al. |

(Continued)

FOREIGN PATENT DOCUMENTS

| | | |
|---|---|---|
| CA | 3154554 A1 | 3/2021 |
| EP | 3741168 A1 | 11/2020 |

(Continued)

OTHER PUBLICATIONS

Overview of Millimeter Wave Communications for Fifth-Generation (5G) Wireless Networks—with a focus on Propagation Models, Rappaport, T.S., et al, *IEEE Transactions on Antennas and Propagation*, Special Issue on 5G, Nov. 2017.

(Continued)

*Primary Examiner* — Dang T Ton
(74) *Attorney, Agent, or Firm* — Patent Beach PC

(57) ABSTRACT

Apparatus and methods for phase noise mitigation in wireless systems and networks. In one embodiment, the apparatus and methods provide enhanced wireless services which provide enhanced performance to 5G millimeter wave system entities base stations (gNodeBs) and their backhaul in support of low-latency and high-throughput operation of these components and the network as a whole. In one variant, an enhanced phase noise mitigation mechanism is provided which has a robust performance in operating in very high frequencies such as millimeter wave spectrum. In yet other implementations, the methods and apparatus described herein can be utilized with respect to mobile devices such as between 5G NR millimeter-wave capable UEs and corresponding gNBs.

20 Claims, 22 Drawing Sheets

(56) References Cited

U.S. PATENT DOCUMENTS

| | | |
|---|---|---|
| 6,771,953 B1 | 8/2004 | Chow et al. |
| 6,782,262 B1 | 8/2004 | Lundborg |
| 9,258,809 B2 | 2/2016 | Liao et al. |
| 9,386,496 B2 | 7/2016 | Gupta et al. |
| 9,526,056 B2 | 12/2016 | Tomici et al. |
| 9,699,663 B1 | 7/2017 | Jovancevic |
| 9,769,692 B2 | 9/2017 | Freda et al. |
| 9,807,778 B2 | 10/2017 | Ma et al. |
| 9,813,148 B2 | 11/2017 | Syed et al. |
| 9,887,864 B1 * | 2/2018 | Han .................. H04L 25/0204 |
| 10,098,568 B2 | 10/2018 | Gazdzinski |
| 10,135,730 B2 | 11/2018 | Chou |
| 10,340,976 B2 | 7/2019 | Kakinada et al. |
| 10,405,192 B2 | 9/2019 | Kakinada et al. |
| 10,484,876 B2 | 11/2019 | Shah et al. |
| 10,492,204 B2 | 11/2019 | Kakinada et al. |
| 10,499,409 B2 | 12/2019 | Shattil |
| 10,506,456 B2 | 12/2019 | Lou et al. |
| 10,531,309 B1 | 1/2020 | Li et al. |
| 10,536,859 B2 | 1/2020 | Gunasekara et al. |
| 10,680,883 B2 | 6/2020 | Hall et al. |
| 10,805,562 B2 | 10/2020 | Nakamura et al. |
| 11,026,205 B2 | 6/2021 | Hmimy et al. |
| 11,219,026 B2 | 1/2022 | Kakinada et al. |
| 2002/0126748 A1 | 9/2002 | Rafie et al. |
| 2004/0001021 A1 | 1/2004 | Choo et al. |
| 2006/0188004 A1 | 8/2006 | Kizu et al. |
| 2008/0097913 A1 | 4/2008 | Dicks et al. |
| 2008/0220786 A1 | 9/2008 | Beacham |
| 2008/0220788 A1 | 9/2008 | Stanwood et al. |
| 2009/0028182 A1 | 1/2009 | Brooks et al. |
| 2009/0034443 A1 | 2/2009 | Walker et al. |
| 2009/0129273 A1 | 5/2009 | Zou |
| 2009/0253438 A1 | 10/2009 | Chater-Lea et al. |
| 2010/0094956 A1 | 4/2010 | Zuckerman et al. |
| 2010/0128608 A1 | 5/2010 | Zou et al. |
| 2010/0234042 A1 | 9/2010 | Chan et al. |
| 2011/0014924 A1 | 1/2011 | Hwang et al. |
| 2011/0292970 A1 | 12/2011 | Lansford et al. |
| 2013/0122903 A1 | 5/2013 | Farnsworth et al. |
| 2013/0281092 A1 | 10/2013 | Gassend |
| 2013/0288675 A1 | 10/2013 | Gassend |
| 2013/0303145 A1 | 11/2013 | Harrang et al. |
| 2013/0315124 A1 | 11/2013 | Rapaport et al. |
| 2013/0336175 A1 | 12/2013 | Um et al. |
| 2014/0106672 A1 | 4/2014 | Jeon et al. |
| 2014/0194068 A1 | 7/2014 | Coppage et al. |
| 2014/0241187 A1 | 8/2014 | Barkay et al. |
| 2014/0269526 A1 | 9/2014 | Mitola, III |
| 2014/0308986 A1 | 10/2014 | Yang et al. |
| 2015/0055623 A1 | 2/2015 | Li et al. |
| 2015/0071239 A1 | 3/2015 | Zhang et al. |
| 2015/0208262 A1 | 7/2015 | Siomina |
| 2015/0280847 A1 | 10/2015 | Somasundaram et al. |
| 2015/0334664 A1 | 11/2015 | Sawai et al. |
| 2016/0007147 A1 | 1/2016 | Zhang et al. |
| 2016/0073259 A1 | 3/2016 | Lee et al. |
| 2016/0128001 A1 | 5/2016 | Tsuda |
| 2016/0165066 A1 | 6/2016 | Yang et al. |
| 2016/0182134 A1 | 6/2016 | Kol et al. |
| 2016/0212031 A1 | 7/2016 | Jain et al. |
| 2016/0234746 A1 | 8/2016 | Gopal et al. |
| 2016/0330743 A1 | 11/2016 | Das et al. |
| 2016/0381600 A1 | 12/2016 | Aksu |
| 2017/0026203 A1 | 1/2017 | Thomas et al. |
| 2017/0155703 A1 | 6/2017 | Hao et al. |
| 2017/0164326 A1 | 6/2017 | Worrall |
| 2017/0208540 A1 | 7/2017 | Egner et al. |
| 2017/0295497 A1 | 10/2017 | MacMullan et al. |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple et al. |
| 2017/0318472 A1 | 11/2017 | Yu et al. |
| 2018/0007587 A1 | 1/2018 | Feldman et al. |
| 2018/0063736 A1 | 3/2018 | Sadeghi et al. |
| 2018/0063758 A1 | 3/2018 | Velu |
| 2018/0115903 A1 | 4/2018 | Badic et al. |
| 2018/0124613 A1 | 5/2018 | Kang et al. |
| 2018/0132112 A1 | 5/2018 | Khoshnevisan et al. |
| 2018/0146058 A1 | 5/2018 | Somayazulu et al. |
| 2018/0146408 A1 | 5/2018 | Meylan et al. |
| 2018/0167948 A1 | 6/2018 | Egner et al. |
| 2018/0199214 A1 | 7/2018 | Shen |
| 2018/0234403 A1 | 8/2018 | Casella et al. |
| 2018/0235007 A1 | 8/2018 | Gou et al. |
| 2018/0242184 A1 | 8/2018 | Yerramalli et al. |
| 2018/0279212 A1 | 9/2018 | Malik et al. |
| 2018/0316563 A1 | 11/2018 | Kumar et al. |
| 2018/0323938 A1 | 11/2018 | Takeda et al. |
| 2019/0021012 A1 | 1/2019 | Beck et al. |
| 2019/0028182 A1 | 1/2019 | Smyth et al. |
| 2019/0037480 A1 | 1/2019 | Sun et al. |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104551 A1 | 4/2019 | Deenoo et al. |
| 2019/0150182 A1 | 5/2019 | Koorapaty et al. |
| 2019/0182895 A1 | 6/2019 | Di Girolamo et al. |
| 2019/0222266 A1 | 7/2019 | Cui et al. |
| 2019/0230613 A1 | 7/2019 | Kim et al. |
| 2019/0239190 A1 | 8/2019 | Patel et al. |
| 2019/0296789 A1 | 9/2019 | Yu et al. |
| 2019/0319814 A1 | 10/2019 | Das |
| 2019/0320490 A1 | 10/2019 | Liu et al. |
| 2019/0349848 A1 | 11/2019 | Bali |
| 2019/0364565 A1 | 11/2019 | Hmimy et al. |
| 2019/0393926 A1 | 12/2019 | Kakinada et al. |
| 2019/0394790 A1 | 12/2019 | Damnjanovic et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0083892 A1 * | 3/2020 | Kundu .................. H03L 7/102 |
| 2020/0084759 A1 | 3/2020 | Liu et al. |
| 2020/0187150 A1 | 6/2020 | Eisner |
| 2020/0221392 A1 | 7/2020 | Xue et al. |
| 2020/0228993 A1 | 7/2020 | Don |
| 2020/0252933 A1 | 8/2020 | Hmimy et al. |
| 2020/0275457 A1 | 8/2020 | Hmimy |
| 2020/0344515 A1 | 10/2020 | Wong et al. |
| 2021/0014693 A1 | 1/2021 | Syed et al. |
| 2021/0051653 A1 | 2/2021 | Park et al. |
| 2021/0076424 A1 | 3/2021 | Mukherjee et al. |
| 2021/0084117 A1 | 3/2021 | Ovadia et al. |
| 2021/0105633 A1 | 4/2021 | Vaidya et al. |
| 2021/0127423 A1 | 4/2021 | Park et al. |
| 2021/0136838 A1 | 5/2021 | Khalid et al. |
| 2021/0204322 A1 | 7/2021 | Lou et al. |
| 2021/0227396 A1 | 7/2021 | Khalid et al. |
| 2021/0235495 A1 | 7/2021 | Xu et al. |
| 2021/0266914 A1 | 8/2021 | Yoo et al. |
| 2021/0274499 A1 | 9/2021 | Hmimy et al. |
| 2021/0297979 A1 | 9/2021 | Hmimy et al. |
| 2022/0007200 A1 | 1/2022 | Volkan et al. |
| 2022/0007374 A1 | 1/2022 | Sevindik et al. |
| 2022/0078804 A1 | 3/2022 | Hmimy |

FOREIGN PATENT DOCUMENTS

| | | |
|---|---|---|
| EP | 3797546 A1 | 3/2021 |
| GB | 2585394 * | 11/2019 |
| JP | 2021510973 A | 4/2021 |
| WO | WO-2013020599 A1 | 2/2013 |
| WO | WO-2017130494 A1 | 8/2017 |
| WO | WO-2019140461 A1 | 7/2019 |
| WO | WO-2019226838 A1 | 11/2019 |
| WO | WO-2020160403 A1 | 8/2020 |
| WO | WO-2021050957 A1 | 3/2021 |
| WO | WO-2021067810 A1 | 4/2021 |
| WO | WO-2021086986 A1 | 5/2021 |

(56) References Cited

FOREIGN PATENT DOCUMENTS

OTHER PUBLICATIONS

Blind Phase Noise Mitigation for a 72 GHz Millimeter Wave System, Thomas, T.A., et al, IEEE ICC 2015 SAC—Millimeter Wave Communications.
Palola M., et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.

* cited by examiner

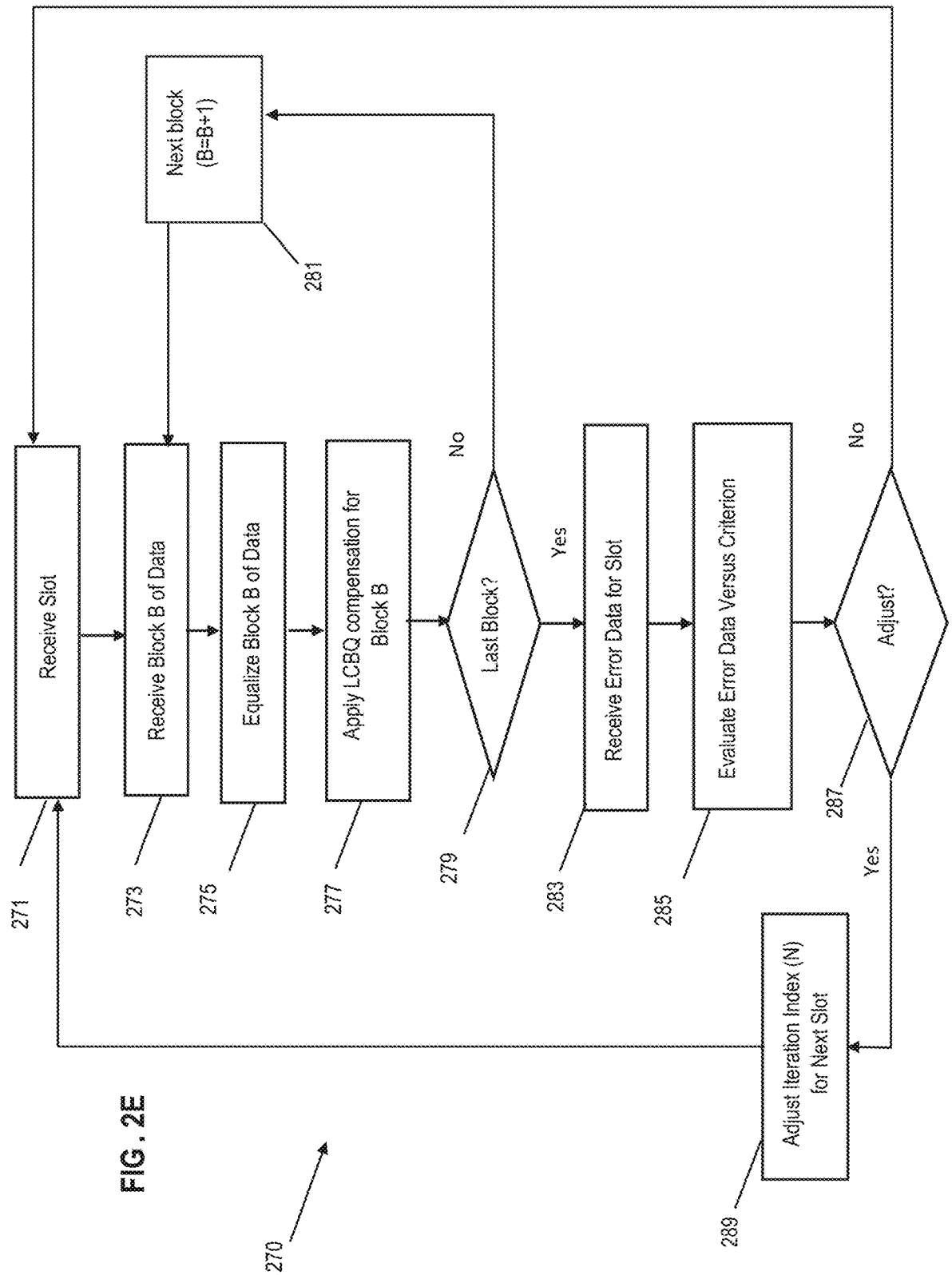

APPARATUS AND METHODS FOR PHASE NOISE MITIGATION IN WIRELESS SYSTEMS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect provides phase noise mitigation mechanisms for a radio network utilizing millimeter wave spectrum.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/ GPRS/ EDGE). |
| | 1900 MHz PCS, Band 2 (GSM/ GPRS/ EDGE). |
| | 850 MHz Cellular, Band 5 (UMTS/ HSPA+ up to 21 Mbit/s). |
| | 1900 MHz PCS, Band 2 (UMTS/ HSPA+up to 21 Mbit/s). |
| 4G | 700 MHz Lower B/C, Band 12/17 (LTE). |
| | 850 MHz Cellular, Band 5 (LTE). |
| | 1700/ 2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Additionally, the 5 GHz band has been allocated for use by, e.g., WLAN equipment.

User client devices (e.g., smartphones, tablets, phablets, laptops, smartwatches, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network or a mobile network operator (MNO) network). A user may generally access the network at a node or "hotspot," a physical location at which the user may obtain access by connecting to modems, routers, APs, etc. that are within wireless range.

Millimeter Wave Communications

NG-RAN or "NextGen RAN (Radio Area Network)" is part of the 3GPP "5G" next generation radio system. 3GPP is currently specifying Release 16 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, NG-RAN leverages technology and functions of extant LTE/LTE-A technologies, as bases for further functional development and capabilities. Furthermore, earlier Releases of 3GPP (e.g., Release 14) have laid the ground work for many aspects of the 5G specification. For instance, one of the salient features of 5G is extending LTE into the millimeter wave (also referred to as "mmWave") frequency band (24 GHz-100 GHz). Utilizing millimeter wave frequency bands in 5G systems will provide 5G wireless channels with more than ten times greater bandwidth than 4G LTE 20 MHz channel, as well as supporting the requisite ultra-low latency (e.g., 1 ms roundtrip) specified for 5G systems. The higher bandwidth range in millimeter wave frequency bands can increase the effective data rates of the systems to hundreds of Mbps.

In addition to 5G, the 57-64 GHz millimeter wave is currently utilized by recent WLAN technologies, e.g., 802.11ad. Using these millimeter wave frequency in WLAN can improve the throughput from e.g., 1 Gbps in the 5 GHz band to reach up to 7 Gbps.

Millimeter Wave System Phase Noise Issues—

The 5G network specification includes a range of spectrum frequencies, including the popular mmWave bands 28 GHz and 39 GHz. The mmWave frequencies provide the availability of plentiful spectrum, including as aggregated channel bandwidth of 1 GHz and higher. Systems utilizing the mmWave frequency bands offer the potential of very high data rates by exploiting the large amount of available spectrum. For instance, some bands (e.g., 71-76 and 81-86) provides 10 GHz of available spectrum, which is more than all the spectrum below 6 GHz currently (partially) used for cellular communications.

Due to this plentiful available mmWave spectrum, carriers want to expand the usage of mmWave spectrum with 5G technology. The use of mmWave will allow increased network capacity and data sharing across the network, including e.g., on backhauls from e.g., gNBs (5G base stations). Such backhauls are often the "bottlenecks" in network performance and throughput (as compared to the air interface between the UE and the gNB). Therefore, the increased bandwidth and spectrum of mmWave can be used to greatly enhance a carrier's network performance and data rate within such backhauls.

Moreover, the increased network capacity improves network Quality of Service (QoS). As previously noted, the increased bandwidth further reduces the overall latency associated with the network, and hence enables some remote applications (e.g., VR/AR, remote healthcare applications, and autonomous vehicles) to experience faster communications via the network.

Likewise, 5G contemplates use of mmWave frequencies between base stations or small cells and mobile devices (UEs), such as in dense urban areas, indoors such as malls or stadiums, and the like, acting in effect as a complement to longer-range sub-6 GHz band systems.

Compared with wireless systems utilizing spectrum below 6 GHz, a mmWave-based wireless system experiences substantially different physical characteristics, such as higher path loss and diffraction losses, and stronger directionality. For instance, resonances of oxygen and other gasses in the air may cause certain bands to suffer from comparatively high levels of atmospheric signal absorption, as can rain and snow. Moreover, mmWave frequencies typically suffer very heavy losses when propagating through other media such as building walls. See, e.g., "Overview of Millimeter Wave Communications for Fifth-Generation (5G) Wireless Networks—with a focus on Propagation Models," Rappaport, T. S., et al, *IEEE Transactions on Antennas and Propagation*, Special Issue on 5G, November 2017, which is incorporated herein by reference in its entirety, which describes various physical and path loss issues and models for mmWave systems. Hence, although the mmWave systems offer larger bandwidth and unprecedented data rates, their practical implementation faces several "hardware" challenges compared to the current RF systems.

Notably, in mmWave frequency systems, the higher carrier frequency (as compared to e.g., sub-6 GHz systems) requires several stages of larger frequency and gain multiplication, which in turn, amplify any RF-based impairments. In particular, so-called "phase noise," which can significantly degrade RF system performance, is amplified or proportionately larger in mmWave RF systems. PN, θ(t), can be modeled as a random time-varying phase added to the carrier per Eqn. (1):

$$y(t)=a(t)*e^{j(2\pi f_0 t+\theta(t))} \quad (1)$$

where $f_o$ is the carrier frequency and t is time in seconds. For digital baseband, the phase noise θ(n) at the sample times is related to the baseband signal a(n) by Eqn. (2):

$$y(n)=a(n)*e^{j\theta(n)} \quad (2)$$

See e.g., "Blind Phase Noise Mitigation for a 72 GHz Millimeter Wave System," Thomas, T. A., et al, IEEE ICC 2015 SAC—Millimeter Wave Communications, which is incorporated herein by reference in its entirety (hereinafter "Thomas, et al"), for a discussion of phase noise in mmWave systems. Typically, phase noise is a random process and often becomes uncorrelated between temporal coordinates which are sufficiently far apart. However, phase noise may be or remain correlated at two relatively close temporal coordinates. Phase noise can in some scenarios be significant enough to require inter-block tracking in frequency-domain equalization systems, where the term "block" refers to a group of data symbols which are jointly processed in the frequency domain). As such, even if the channel under consideration does not significantly change on an inter-block basis, an unknown amount of phase noise may need to be tracked or compensated for from block-to-block.

Hence, in proposed 5G (and other) mmWave implementations, phase noise will need to be compensated for to ensure the stringent performance goals of such systems are met. Specifically, in a 5G system where the received baseband signal is processed on a block-by-block basis as previously described, the effects of the phase noise require some tracking algorithm to compensate, in the form of Digital Signal Processing.

Two algorithms are described in Thomas, et al. to ostensibly mitigate the phase noise effects: (i) Power Law Estimation (hereinafter "PLE"), and (ii) "Blind-QAM" (hereinafter "BQ"). The PLE algorithm offers a generally straightforward solution, with relatively low implementation complexity. However, although this algorithm generally performs acceptably under high SNR (signal-to-noise ratio), its performance suffers under low SNR conditions, thereby significantly limiting its applicability (e.g., in cases where low SNR is expected/encountered).

In contrast, the BQ algorithm performs generally better than that of the PLE approach; however, BQ requires an iterative process that significantly increases the implementation complexity. Such complexity and processing overhead may both increase the required capability and required processing time by e.g., digital processing logic for such tracking/compensation, thereby increasing latency and also the cost of any such solution.

Accordingly, there exists a need for an improved apparatus and methods for phase noise tracking and compensation within wireless systems such as 5G NR backhaul, base station, and UE/IoT systems utilizing mmWave frequencies. Specifically, what is needed are, inter alia, methods and apparatus to efficiently and robustly measure, estimate and compensate the RF impairments such as phase noise. Ideally, such method and apparatus would enhance radio network performance and capacity while requiring only a minimum of processing overhead or capability, and would be effective at low, intermediate, and high values of channel SNR.

SUMMARY

The present disclosure addresses the foregoing needs by providing, inter alia, apparatus and methods for phase noise tracking and compensation in a wireless network.

In a first aspect, a method of compensating for phase noise in a wireless system is disclosed. In one embodiment, the method includes using an LCBQ (low complexity blind-QAM) based algorithm to track (and compensate for) phase noise in a mmWave system.

In another embodiment, the method is for correcting phase error in a received signal, and includes: receiving a block of input data symbols comprising a first data symbol and a last data symbol; applying an equalization process to the block of input data symbols starting with the first data symbol to produce an equalized block of input data symbols; de-rotating the equalized block of input data symbols using a first value; estimating second value for the equalized block of input data symbols using a reduced complexity model; and applying a phase error compensation to the equalized block of input symbols based at least in part on the estimated second value.

In one variant, the estimating the second value is based at least on a concatenation of at least a portion of points of a constellation (e.g., a 64-QAM constellation) formed by the symbols of the input data block which exceed a prescribed limit.

In one implementation, a selection of the at least portion of points of the constellation is based at least in part on a specific Cartesian coordinate area of the constellation (e.g., as specified by limits).

In another variant, the method further includes applying the second value as part of estimating a phase error compensation for a subsequent input data block, the input data block and the subsequent input data block each being part of a TDM (time division multiplexed) slot data structure.

In another variant, the receiving the input data block comprises receiving the input data block over a physical channel, the physical channel comprising a wireless channel having a carrier frequency within a mmWave band.

In another aspect, computerized apparatus for tracking and compensating for phase noise in a wireless system is disclosed. In one embodiment, the computerized apparatus comprises a digital baseband processor apparatus which includes logic (e.g., software or firmware executing thereon) which performs a series of iterations (including rotations and de-rotations) so as to compensate for phase noise in a robust and efficient manner.

In another embodiment, the computerized network apparatus is configured for use in a wireless infrastructure, and includes: digital processing apparatus; at least one wireless interface in data communication with the digital processing apparatus, the at least one wireless interface operative to utilize a mm wave radio frequency (RF) band for communication of data; and a storage device in data communication with the digital processing apparatus, the storage device comprising a storage medium having at least one computer program. In one variant, the at least one computer program configured to, when executed on the digital processing apparatus, cause the computerized network apparatus to: apply a non-iterative phase noise compensation algorithm for at least reception of said data.

In one implementation, the computerized apparatus comprises a 3GPP 5G NR-U capable gNodeB. In another implementation, the computerized network apparatus comprises a 5G NR capable UE (user equipment).

In yet another implementation, the computerized network apparatus further comprises an equalization apparatus in data communication with said digital processing apparatus, and the non-iterative phase noise compensation algorithm is applied after equalization by said equalization apparatus.

In one configuration thereof, the non-iterative phase noise compensation algorithm is configured to perform a de-rotation before said equalization, and then estimate a second de-rotation based at least on a subset of constellation points associated with the data, the estimate occurring without further iteration. For example, the subset of constellation points associated with the data may be selected based on a plurality of spatial limit criteria. The subset may include for example only corners of the constellation.

In a further aspect, a method of operating a wireless interface is disclosed. In one embodiment, the interface includes a backhaul interface utilizing mmWave frequencies. In another embodiment, the interface is an air interface between a user device or IoT device and a small cell or microcell. In yet another embodiment, the interface is a backhaul between a macro-cell and a microcell.

In another aspect, wireless base station apparatus is disclosed. In one embodiment, the base station apparatus is configured as a 3GPP 5G NR compliant gNB, small cell, or microcell utilizing mmWave frequencies for its air interface and/or backhaul.

In another aspect, wireless backhaul apparatus is disclosed. In one embodiment, the apparatus includes a data aggregation apparatus configured to provide backhaul for a number of base stations (e.g., 5G gNBs).

In another aspect, wireless user apparatus is disclosed. In one embodiment, the wireless user apparatus includes a 3GPP 5G NR compliant UE (user equipment). In another embodiment, the apparatus includes an IoT device.

In another aspect, a Low Complexity Blind-QAM (LCBQ) algorithm and associated method is disclosed. In one embodiment, the LCBQ algorithm and method advantageously provides a compromise between implementation complexity and performance, thereby making it suitable for a broad variety of applications.

In one variant, the degree of compromise or tradeoff is designer- or operator-selectable, such as via software or firmware configuration.

In another variant, the degree of compromise or tradeoff is dynamically variable, and may be controlled via ML or AI algorithms or other machine-based "intelligence" algorithms such that the controlled mmWave equipment (e.g., backhaul, gNB, UE, etc.) will self-optimize based on one or more operating environment parameters or characteristics such as the presence of rain, snow, interferers, etc. which may reduce SNR.

In one variant, a 5G NR-U unlicensed device (e.g. gNB and/or UE) operating across unlicensed frequency band is utilized. In one implementation, the 5G NR-U device performs phase noise tracking and mitigation in one or more of the aforementioned mmWave frequency bands.

In another aspect of disclosure, computer readable apparatus is disclosed. In one embodiment, the apparatus includes a storage medium configured to store one or more computer program. In one embodiment, the apparatus includes a program memory, PROM, SRAM, or HDD or SDD on a computerized base station or backhaul device, such as MSO backhaul interface from a gNB.

In a further aspect, an integrated circuit (IC) is disclosed. In one embodiment, the IC is configured to perform baseband phase noise correction within a wireless (e.g., millimeter wave) receiver device, and includes logic which, when utilized or executed, is configured to estimate and correct for phase noise error within blocks of received data. in one variant, the blocks of received data are included within one or more TDM slots, and each block includes a plurality of symbols. Whether on a block-by-block or symbol-by-symbol basis, de-rotation by a first angle, estimation of residual noise, spatial restriction, and de-rotation by a second angle are applied in one implementation to correct for the phase noise. In one configuration, the IC uses the foregoing approach within a single operation (i.e., without further iterations) to, inter alia, conserve electrical power.

These and other aspects shall become apparent when considered in light of the disclosure provided herein.

BRIEF DESCRIPTION OF THE DRAWINGS

FIG. 2E is logic flow diagram illustrating a fourth exemplary embodiment of method for phase noise tracking and correction according to the present disclosure.

Figure 1:
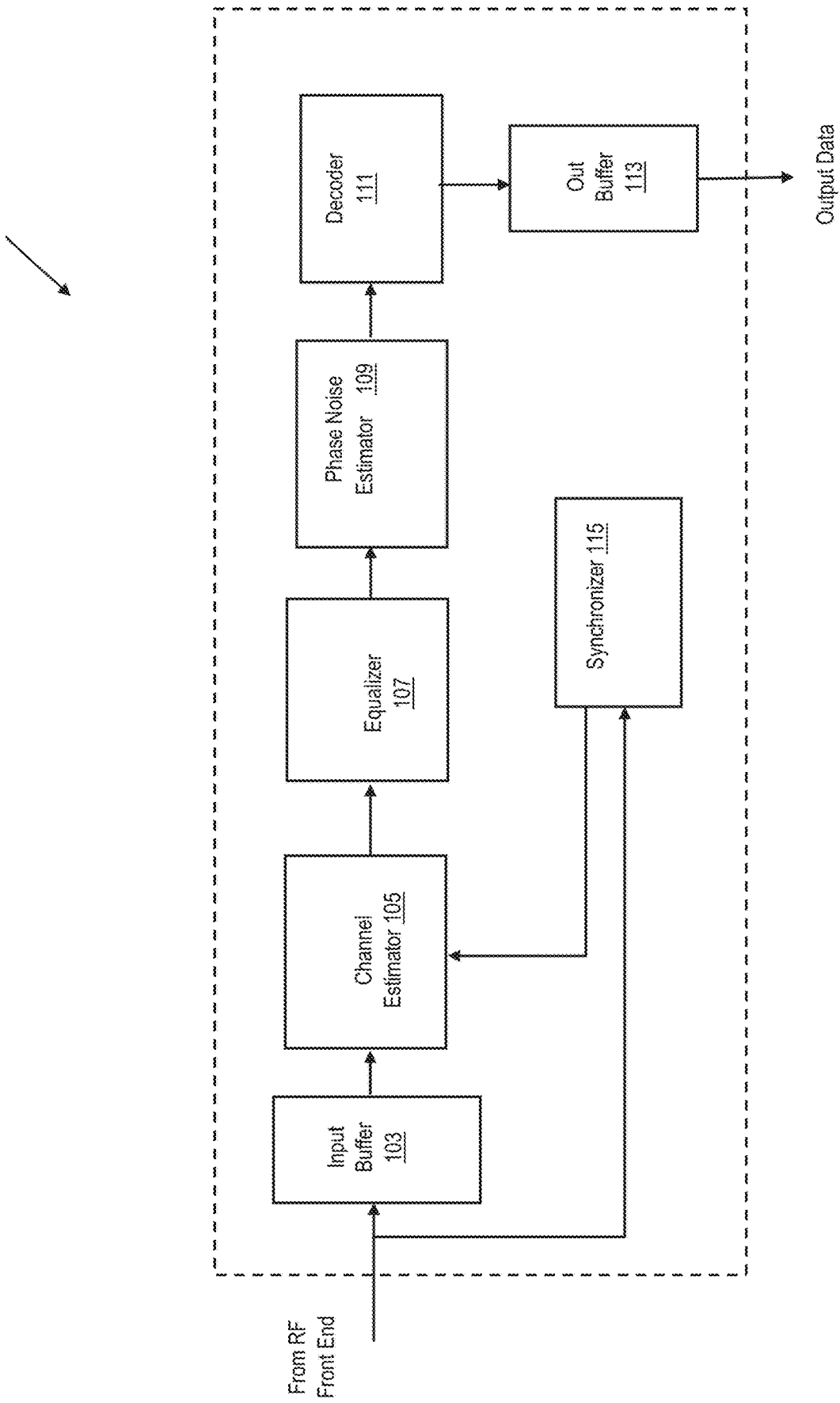
FIG. 1 is a block diagram of one exemplary prior art configuration of a phase noise compensation apparatus.

All figures © Copyright 2019 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, Ruby, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 3.0, 3.1 and 4.0.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, spin-RAM and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, GPUs (graphics processing units), gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "mmWave" refers to, without limitation, any device or technology or methodology utilizing millimeter wave spectrum between 24 GHz and 300 GHz.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed, as well as any related technologies such as 5G NR-U.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein the terms "unlicensed" and "unlicensed spectrum" refer without limitation to radio frequency spectrum (e.g., from the sub-GHz range through 100 GHz) which is generally accessible, at least on a part time basis, for use by users not having an explicit license to use, such as e.g., ISM-band, 2.4 GHz bands, 5 GHz bands, 6 GHz bands, quasi-licensed spectrum such as CBRS, 60 GHz (V-Band), 5G NR-U bands, and others germane to the geographic region of operation (whether in the U.S. or beyond) that will be appreciated by those of ordinary skill given the present disclosure.

As used herein, the term "Wi-Fi" refers to, without limitation and as applicable, any of the variants of IEEE Std. 802.11 or related standards including 802.11 a/b/g/n/s/v/ac/ad/ax, 802.11-2012/2013 or 802.11-2016, as well as Wi-Fi Direct (including inter alia, the "Wi-Fi Peer-to-Peer (P2P) Specification", incorporated herein by reference in its entirety).

As used herein, the term "xNB" refers to any 3GPP-compliant node including without limitation eNBs (eU-TRAN) and gNBs (5G NR).

OVERVIEW

In one exemplary aspect, the present disclosure provides improved architectures, methods and apparatus for providing enhanced wireless services which, inter alia, utilize improved phase noise mitigation mechanism for mmWave spectrum. In one exemplary embodiment, an LCBQ (low complexity blind QAM) based approach is utilized to simultaneously optimize both performance and low processing and hardware overhead. As such, the exemplary embodiments herein enable, among other things, an enhancement for tracking phase noise which can have low implementation complexity and can be advantageously used in a broad range of mmWave devices including access nodes (e.g. 5G NR gNBs), backhaul devices, and user devices (e.g. 5G NR UEs or IoT devices).

In one aspect, a 5G mmWave-based transceiver is described, wherein the receiver includes an Enhanced Phase Noise Estimator (ENPE) module which implements the aforementioned LCBQ algorithms. The ENPE is an apparatus for correcting phase error in a received data block which in one implementation includes a first phase de-rotator, hard limiter, phase estimator, and a second phase de-rotator. In one configuration, the phase rotator includes a low complexity mechanism that blindly track the phase error in the received data block, while the phase de-rotators are configured to apply the phase compensation to the received data block in a single operation (without iteration).

In other variants, the LCBQ algorithms and logic are configured to be dynamically variable (e.g., as to one or more parameters associated with the compensation processes such as number of iterations) whether by a user/operator, designer, or a computerized process or controller such as one implementing machine learning (ML) or AI (artificial intelligence) algorithms, thereby enabling the EPNE-equipped device to automatically and dynamically adapt to an operating condition or environment.

DETAILED DESCRIPTION OF EXEMPLARY EMBODIMENTS

Exemplary embodiments of the apparatus and methods of the present disclosure are now described in detail. While these exemplary embodiments are described in the context of a managed network of a service provider (e.g., MSO and/or MNO networks), other types of radio access technologies ("RATs"), other types of networks and architectures that are configured to deliver digital data (e.g., files, text, images, games, software applications, video and/or audio) may be used consistent with the present disclosure.

Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises, or one mobile in nature), the present disclosure may be readily adapted to other types of environments including, e.g., outdoors, commercial/retail, or enterprise domain (e.g., businesses), or even governmental uses. Yet other applications are possible.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a licensed spectrum context; e.g., for cellular voice or data bandwidth/spectrum allocation, such as in cases where a given service provider must alter its current allocation of available spectrum to users.

Further, while some aspects of the present disclosure are described in detail with respect to so-called 5G "New Radio" (3GPP Release 15 and TS 38.XXX Series Standards and beyond), such aspects are generally access technology "agnostic" and hence may be used across different access technologies, and can be applied to, inter alia, any type of P2MP (point-to-multipoint) or MP2P (multipoint-to-point) technology.

Additionally, while described in the context of a given exemplary modulation approach (e.g., 64-QAM), it will be appreciated that the methods and apparatus of the present disclosure may be readily adapted to other modulation schemes such as e.g., QPSK and BPSK by those of ordinary skill, when given the present disclosure.

Other features and advantages of the present disclosure will immediately be recognized by persons of ordinary skill in the art with reference to the attached drawings and detailed description of exemplary embodiments as given below.

Phase Noise—

Before discussing the exemplary embodiments of the methods and apparatus of the present disclosure, it is useful to review in detail exemplary use cases for these improved methods and apparatus, specifically in terms of mmWave applications, to provide context.

FIG. 1 illustrates a typical prior art apparatus 100 used for phase noise tracking and compensation. As shown, the apparatus includes an input buffer 103, channel estimator 105, equalizer 107, phase noise estimator 109 (e.g., one using BQ or PLE methodologies previously described herein), a decoder 111, synchronizer 115, and output buffer 113. In operation, the PLE or BQ algorithms previously described are applied to incoming data received via the input buffer 103, and output (compensated) data is provided via the output buffer 113.

Figure 1A:
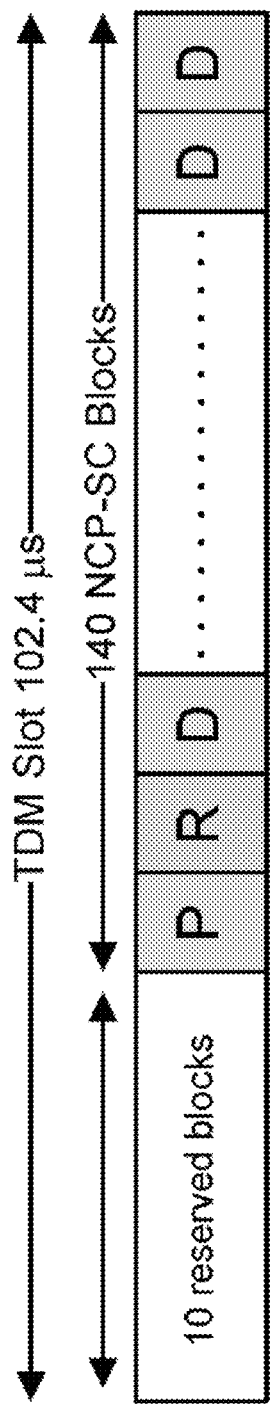
FIG. 1A is a graphical illustration of one exemplary prior art TDM slot configuration including NCP-SC symbol blocks.
Figure 1B:
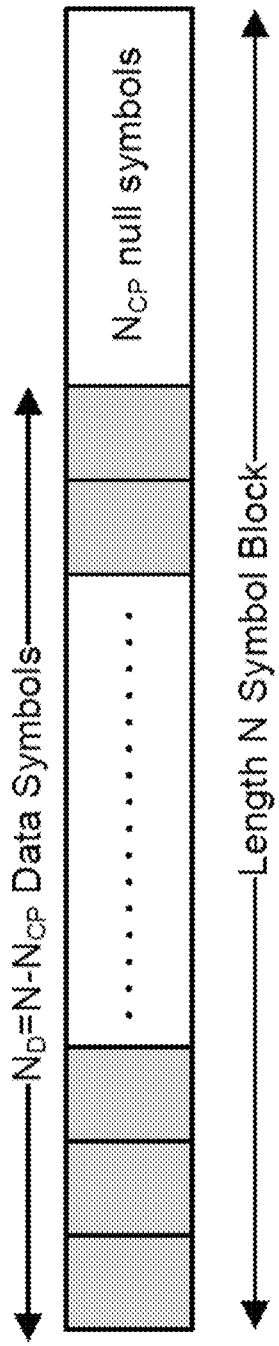
FIG. 1B is a graphical illustration of one exemplary prior art symbol block configuration used with the TDM slot of FIG. 1A.

FIGS. 1A and 1B show a typical prior art frame format used within a null cyclic prefix single carrier (NCP-SC) system. As shown in FIG. 1A, at beginning of a typical TDM slot frame, 10 blocks are reserved for future use such as control, followed by a pilot block (P), which is followed by another reserved block (R). The data blocks (D) contain 138 data coded symbols. An example of an NCP-SC data block structure of length N is shown in FIG. 1B which includes a block of $N_D = N - N_{CP}$ symbols.

Figure 1C:
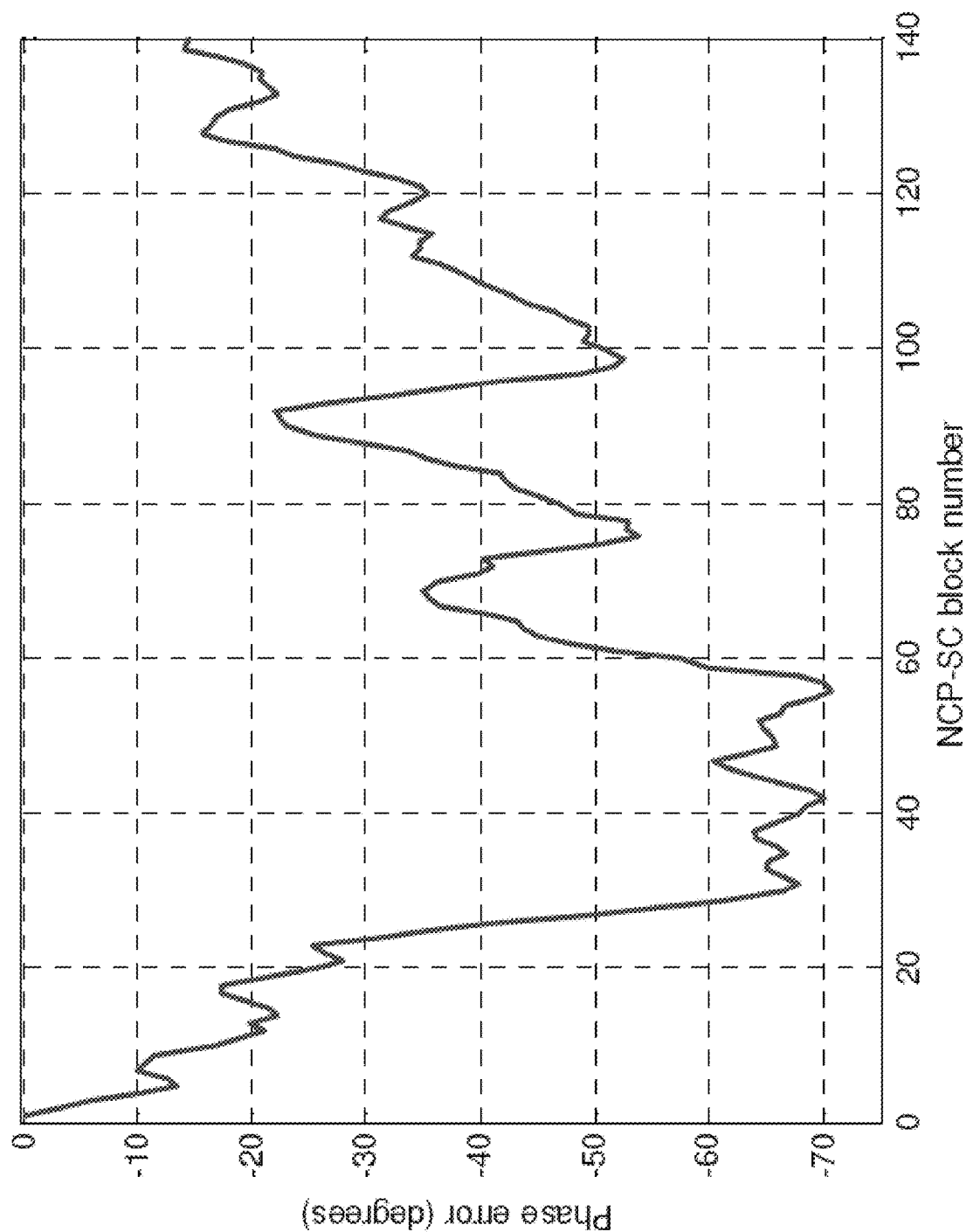
FIG. 1C is a graph of a typical NCP-SC symbol block number versus phase error for the TDM slot configuration of FIG. 1A.

FIG. 1C shows an exemplary plot of phase error vs NCP-SC block number under the prior art. As shown, the phase noise error varies during the length of the slot. This performance variation occurs due to the fact that although the channel varies little during the length of the slot, the effective channel for each of the constituent NCP-SC blocks of the slot will be equal to the one measured on the pilot NCP-SC block (P)—see FIG. 1A —multiplied by an unknown phase value. This behavior (large variations in phase error over the slot) underscores the need for effective phase noise compensation.

Methodology

With the foregoing as a backdrop, exemplary embodiments of improved LCBQ-based methods of phase noise tracking and compensation in scenarios such as those of FIGS. 1A-1C are shown and described in detail. It will be appreciated that while described in the context of the foregoing TDM slot and data block protocols, the various aspects of the present disclosure are in no way so limited, and in fact may be applied to other types of data structures and protocols where such phase noise arises and requires compensation, the following being merely exemplary.

Figure 2A:
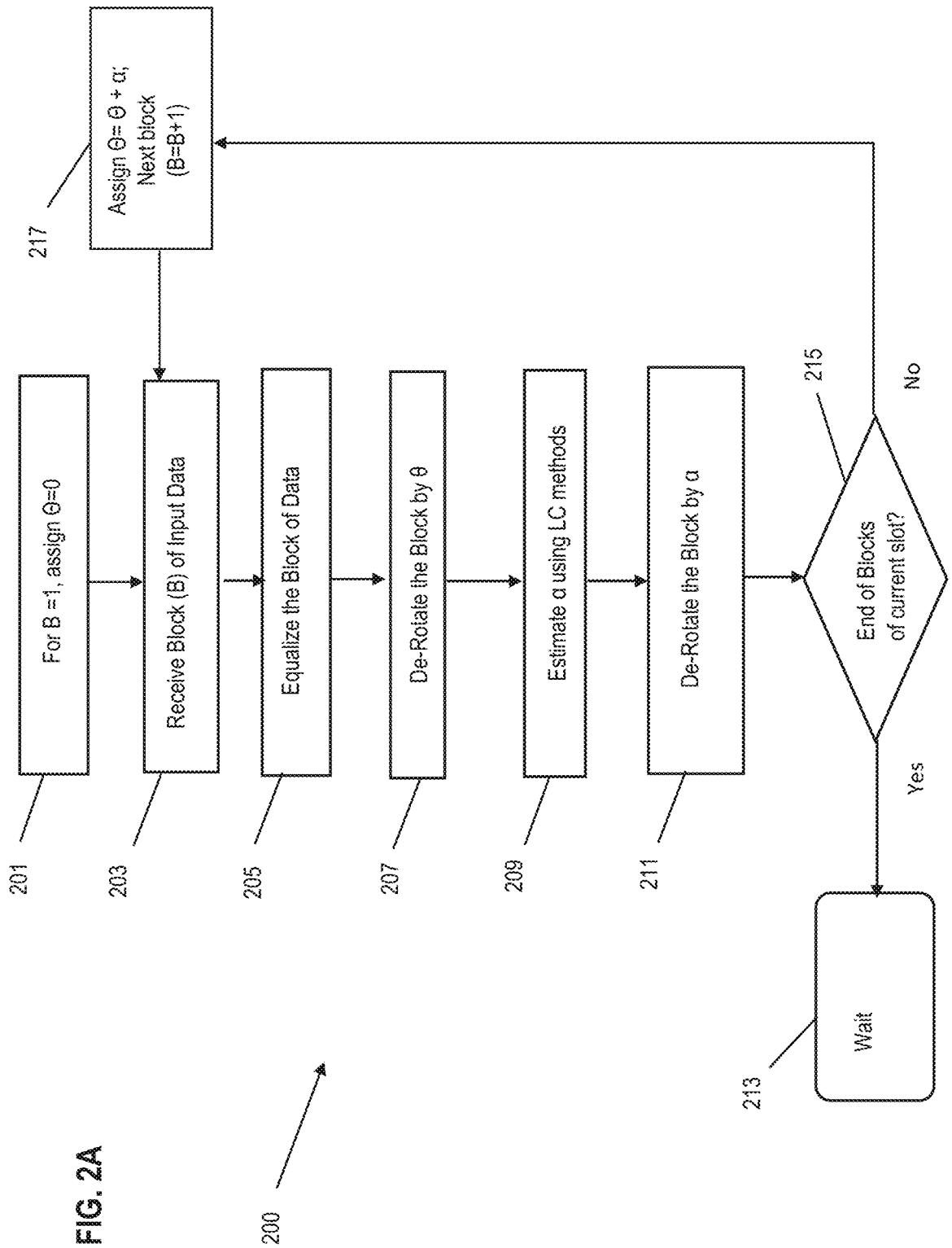
FIG. 2A is logic flow diagram illustrating a first exemplary embodiment of a method for phase noise tracking and correction according to the present disclosure.
Figure 5:
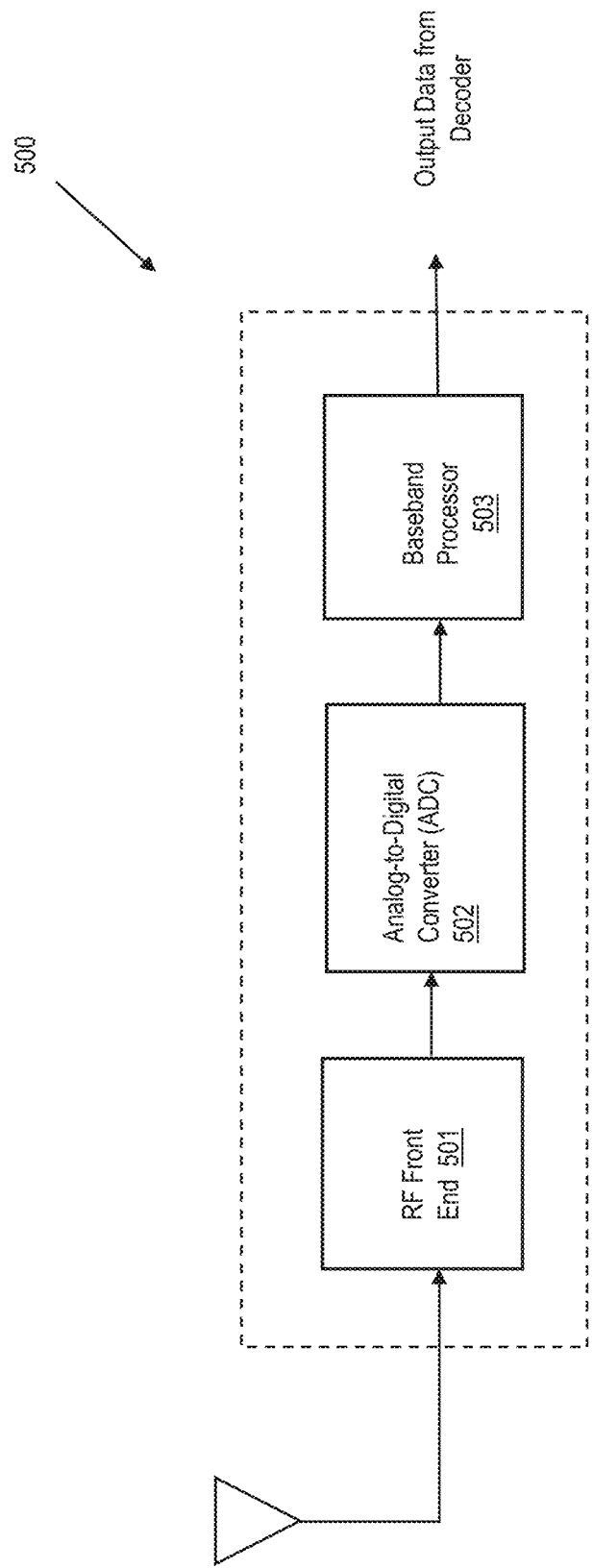
FIG. 5 is a conceptual block diagram illustrating an embodiment of a generalized phase noise compensation apparatus according to the present disclosure.

FIG. 2A is a flowchart illustrating an exemplary embodiment of a generalized method 200 for mmWave phase noise mitigation mechanisms according to the present disclosure. This methodology is described in the exemplary context of the mmWave phase noise mitigation system referenced herein, although it will be appreciated that it may be adapted to other procedures and applications by those of ordinary skill given the present disclosure. It will further be appreciated that while various aspects of the method 200 are described with reference to the exemplary apparatus of FIGS. 5-5C presented infra, although it may be practiced by other apparatus, the referenced configurations being merely exemplary.

Per step 201 of FIG. 2A, the variable θ (the phase error or angle associated with Block 1) is assigned a value of zero (0). It will be appreciated that while the present embodiment assumes a value of zero associated with Block 1 (by virtue of the channel estimation corresponding thereto), the present disclosure contemplates scenarios where the value of θ is set to a non-zero value (e.g., where the process 200 is begun at say Block 2 or 3 for whatever reason), although the block that is closest to the pilot block is typically what is used as the reference block due to the fact that it has the least phase error relative to the pilot block.

Per step 203, the first block of input data B (such as the first (D) of FIG. 1A) is received (B=1 for the current slot).

Per step 205, the received block of data is equalized. The equalization corrects the phase and amplitude of the received data resulting from phase and amplitude variation in the physical wireless channel.

Per step 207, the block of data is de-rotated by θ, where:

$$Y = Eq(B) * e^{-j*\theta} \quad (3)$$

where Eq (B) is the equalized data block.

Figure 4A:
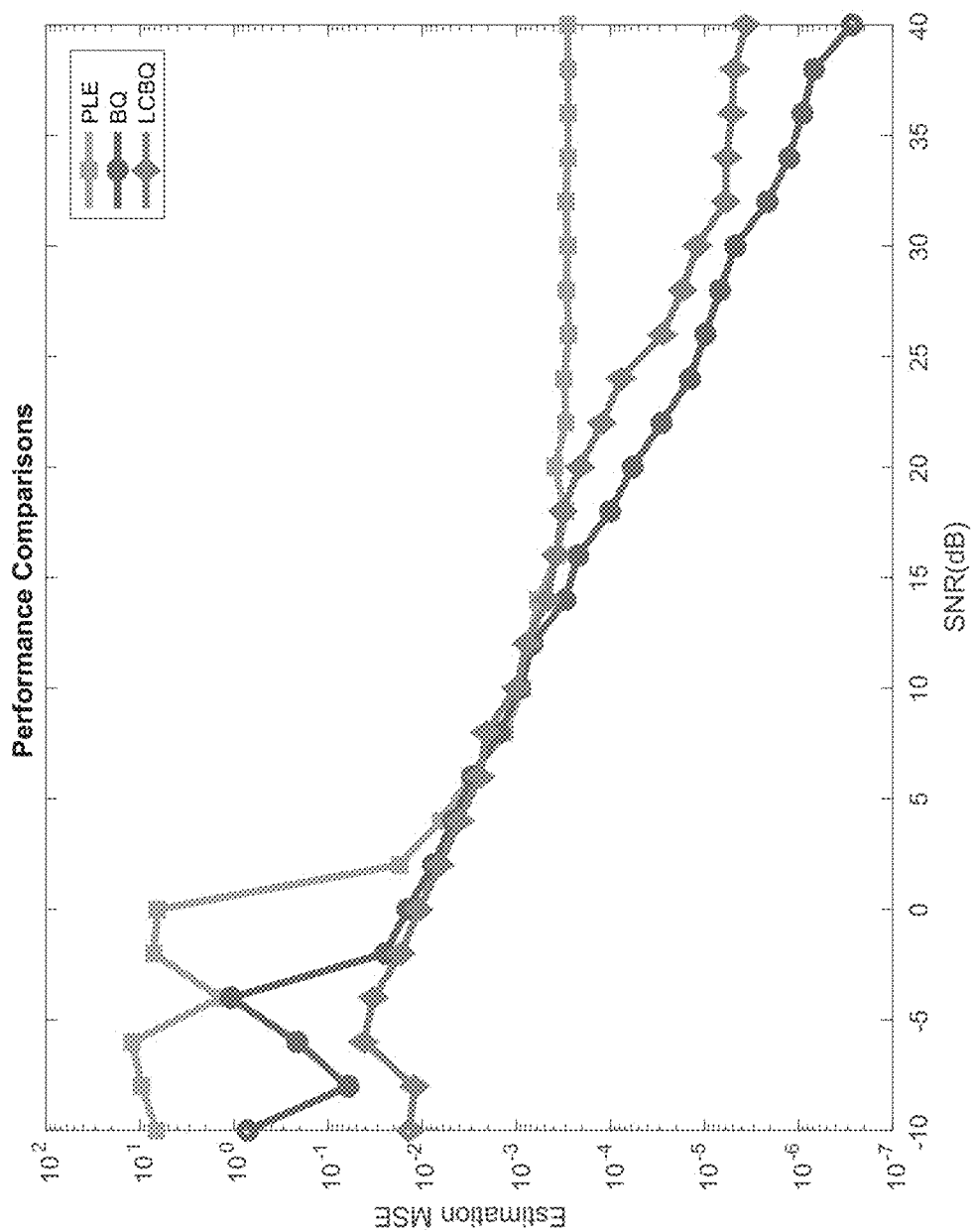
FIG. 4A is a graph of simulated performance (Estimation MSE vs. SNR) comparing prior art PLE and BQ methodologies to an exemplary embodiment of the LCBQ methodology of the present disclosure, for five (5) iterations.
Figure 4B:
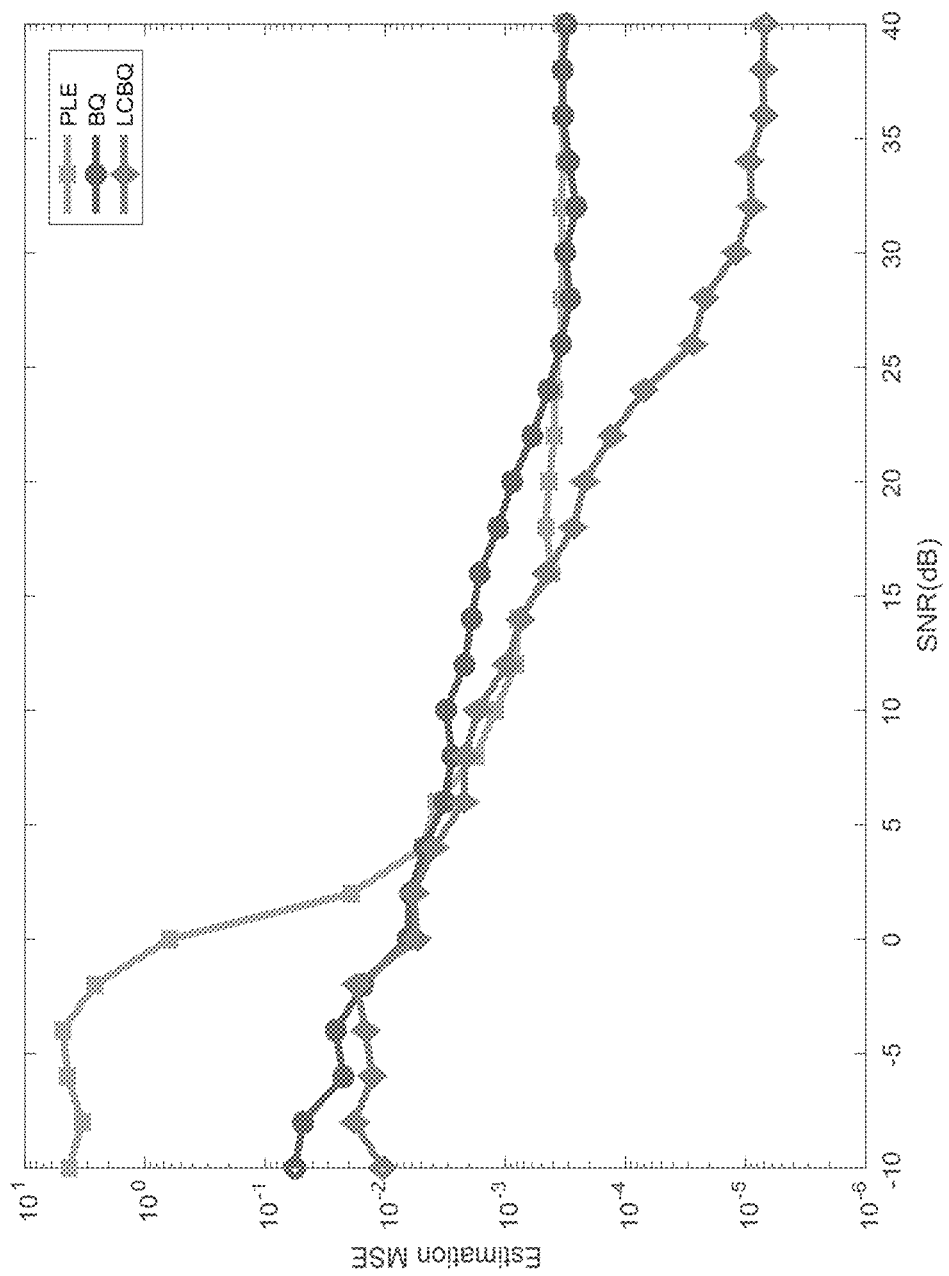
FIG. 4B is a graph of simulated performance (Estimation MSE vs. SNR) comparing prior art PLE and BQ methodologies to an exemplary embodiment of the LCBQ methodology of the present disclosure, for no (zero) iterations.

Next, per step 209, the value of α (which can be thought of as a residual rotation or phase noise left uncorrected from the initial rotation) is estimated, and the block of data is de-rotated by α per step 211. It should be noted that step 209 is one area of significant departure from the prior art PLE and BQ approaches; i.e., a low-complexity approach for estimation of α (described subsequently herein in greater detail) is used in the embodiment of FIG. 2A in order to obtain the previously described benefits. Specifically, no use of multiple iterations and supporting calculations as in the BQ approach of Thomas, et al is required (e.g., Steps 3-7 of the methodology described therein), thereby optimizing the algorithm for both performance and low overhead as shown in FIGS. 4A and 4B herein (although it may be used in varying degrees in cases where the benefits of greater performance may be required, and processing overhead is not a salient constraint).

Per step 215, if the last block of the current time slot has been processed, the method proceeds to a wait state 213 awaiting receipt of more blocks (e.g., associated with the next slot) for processing. If the last block of the current slot has not been processed per step 215, then the next block is queued (e.g., its index incremented by 1) and θ is assigned a value of θ=θ+α, per step 217. That is to say that the last value of θ used (e.g., 0 for block B=1 and other values thereafter for blocks B=2 and beyond) is adjusted by the then-current value of α. This value (α) is utilized so as to provide a "best estimate" of the phase noise at the end of the last block (e.g., B=1 in the above example) just processed, which should in theory be similar to that at the first symbol of the new block (B=B+1) being processed, since the physical channel does change appreciably between the end of the first block and the new block.

Figure 2B:
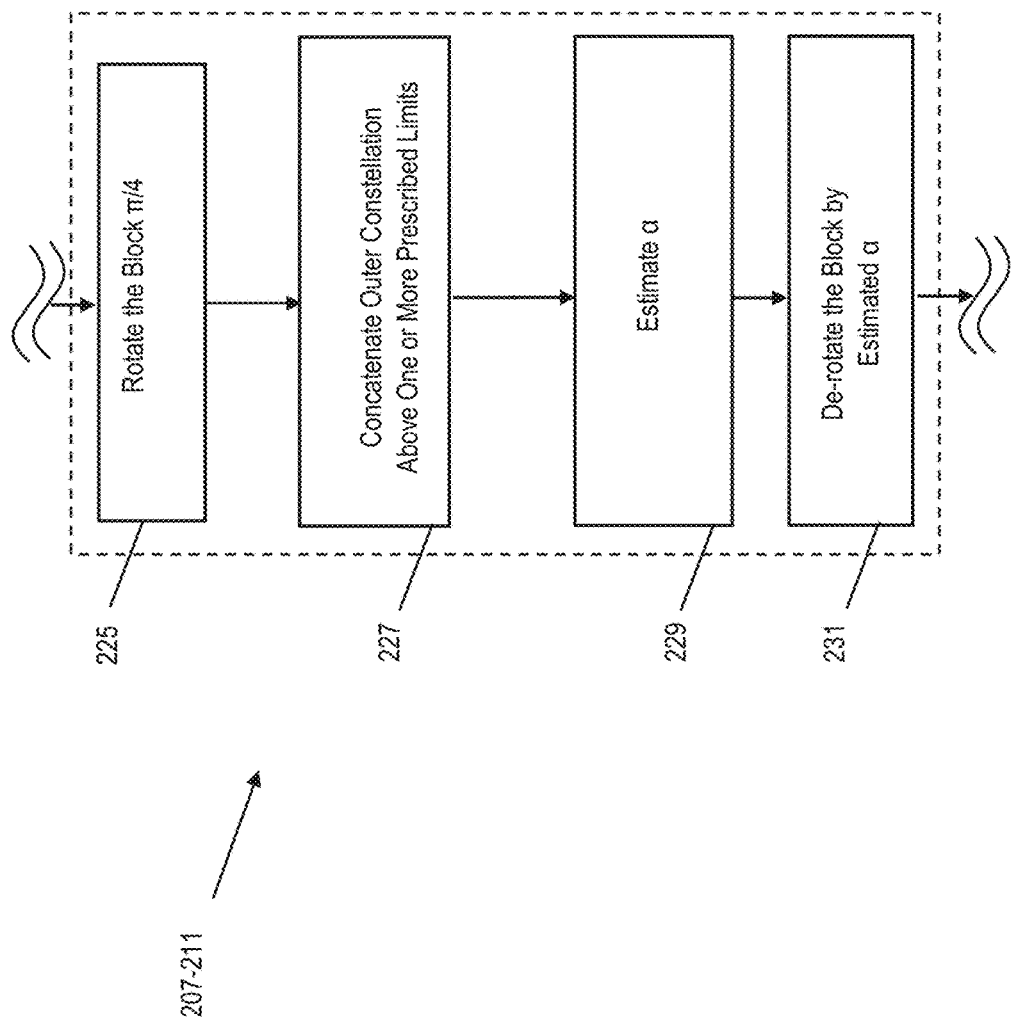
FIG. 2B is logic flow diagram illustrating an exemplary implementation of the method of FIG. 2A.

FIG. 2B is a flowchart illustrating a specific implementation of portions of the methodology of FIG. 2A for compensating for phase noise using LC (low complexity) methods. This method focuses on a particular region of interest (ROI) of the constellation; here, the "corners" of the constellation (see discuss of exemplary 64-QAM constellation of FIGS. 3A-3C below). Specifically, the equalized received data block is rotated π/4 radians or 45 degrees per step 225. As discussed below, the value of this rotation (π/4) is selected in this embodiment to align the corners (ROIs) of the constellation so as to facilitate easy isolation thereof from the rest of the constellation using a set of limit values.

Per step 227, the block (constellation) is concatenated within the ROIs (e.g., to isolate the corners).

Per step 229, the value of the residual error a is then estimated. The constellation is then de-rotated by α (step 231).

Figure 3A:
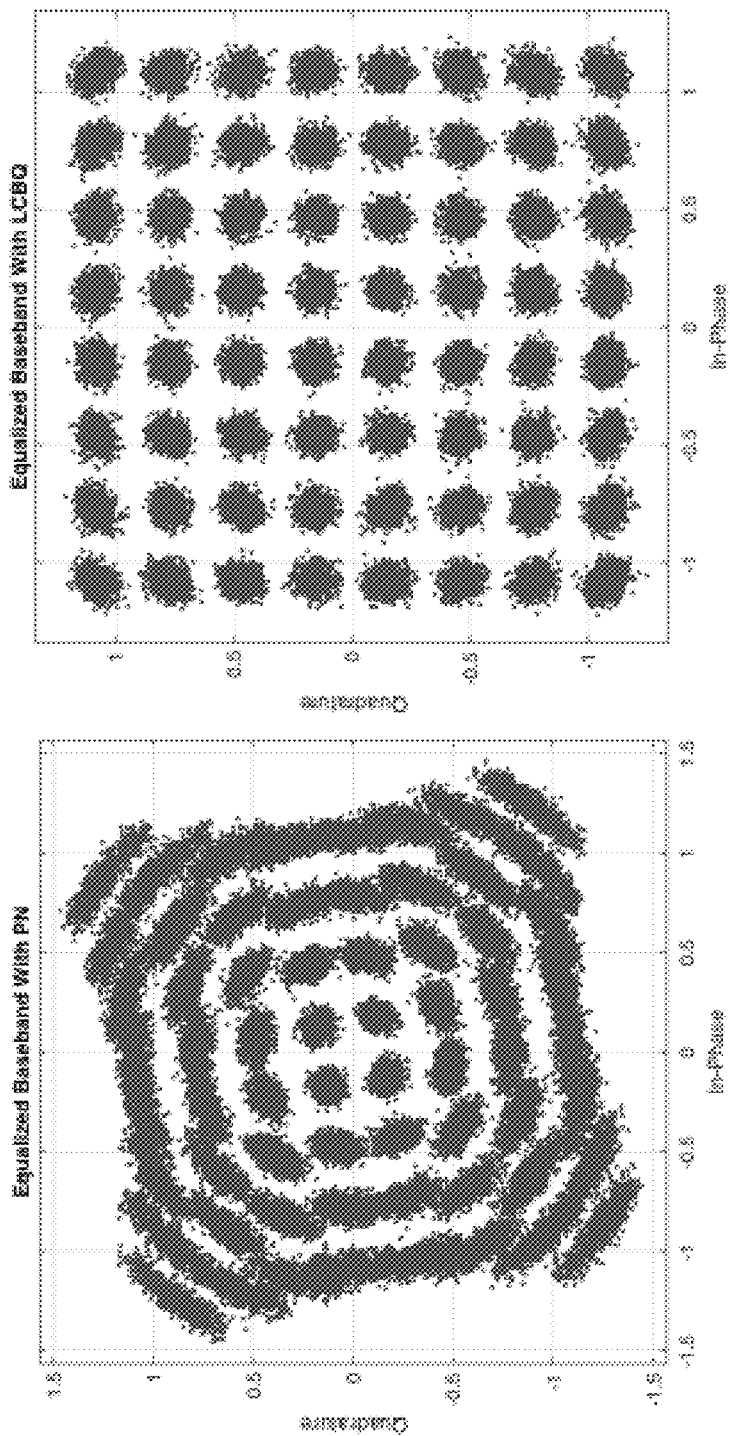
FIG. 3A is a graphical representation of simulated in-phase vs. quadrature 64-QAM constellation data for baseband signals before and after compensation according to the methods of the present disclosure.

FIG. 3A is a graphical representation of simulated in-phase vs. quadrature 64-QAM constellation data for baseband signals (e.g., one entire slot) before and after compensation according to the methods of the present disclosure. As noted, the constellation before compensation (left) is noisy with symbols rotated and displaced due to phase noise. As shown in the after-compensation image (right), the constellation is significantly improved and un-rotated relative to the originally transmitted data.

Figure 3B:
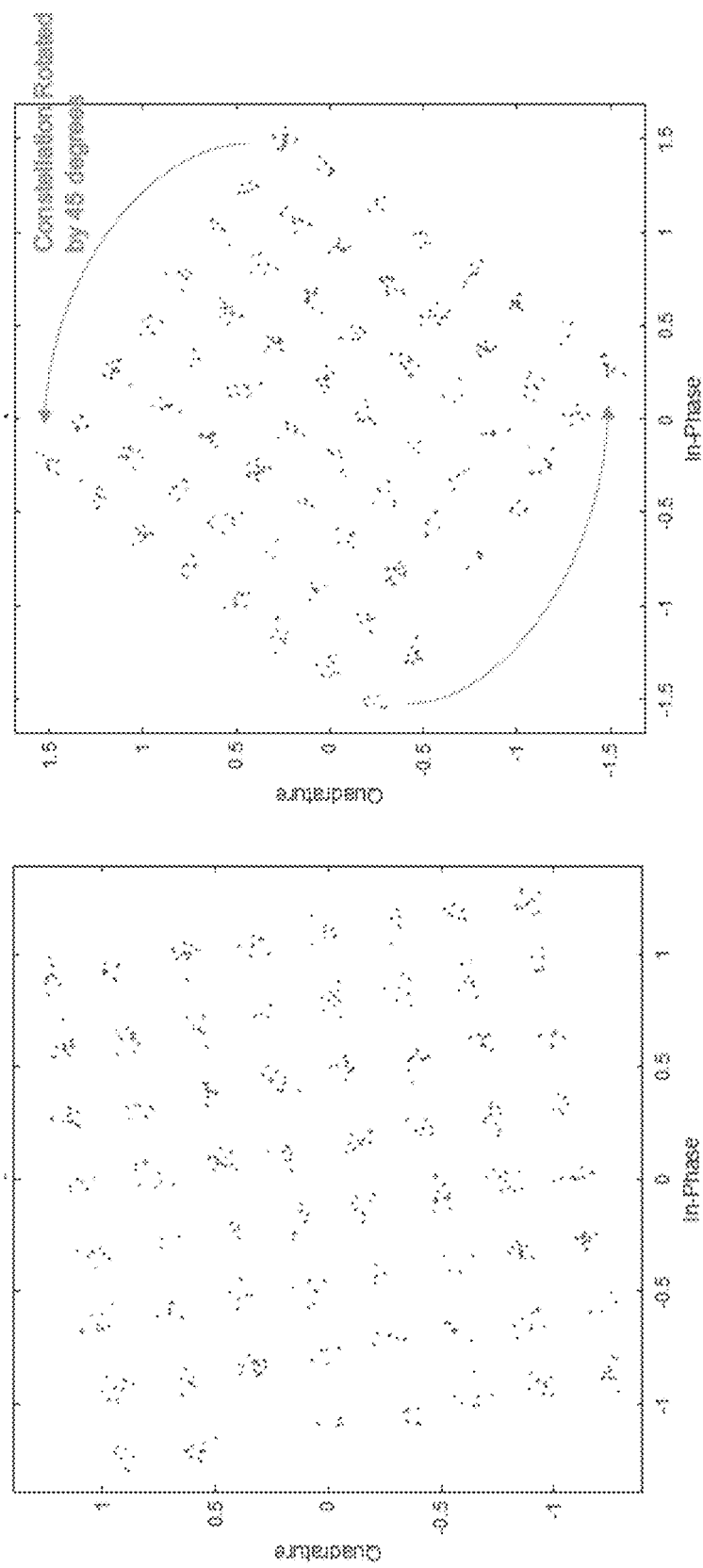
FIGS. 3B-3C are graphs of simulated in-phase vs. quadrature constellation data (intermediate stage) for baseband signals compensated using the methodology of the present disclosure.
Figure 3C:
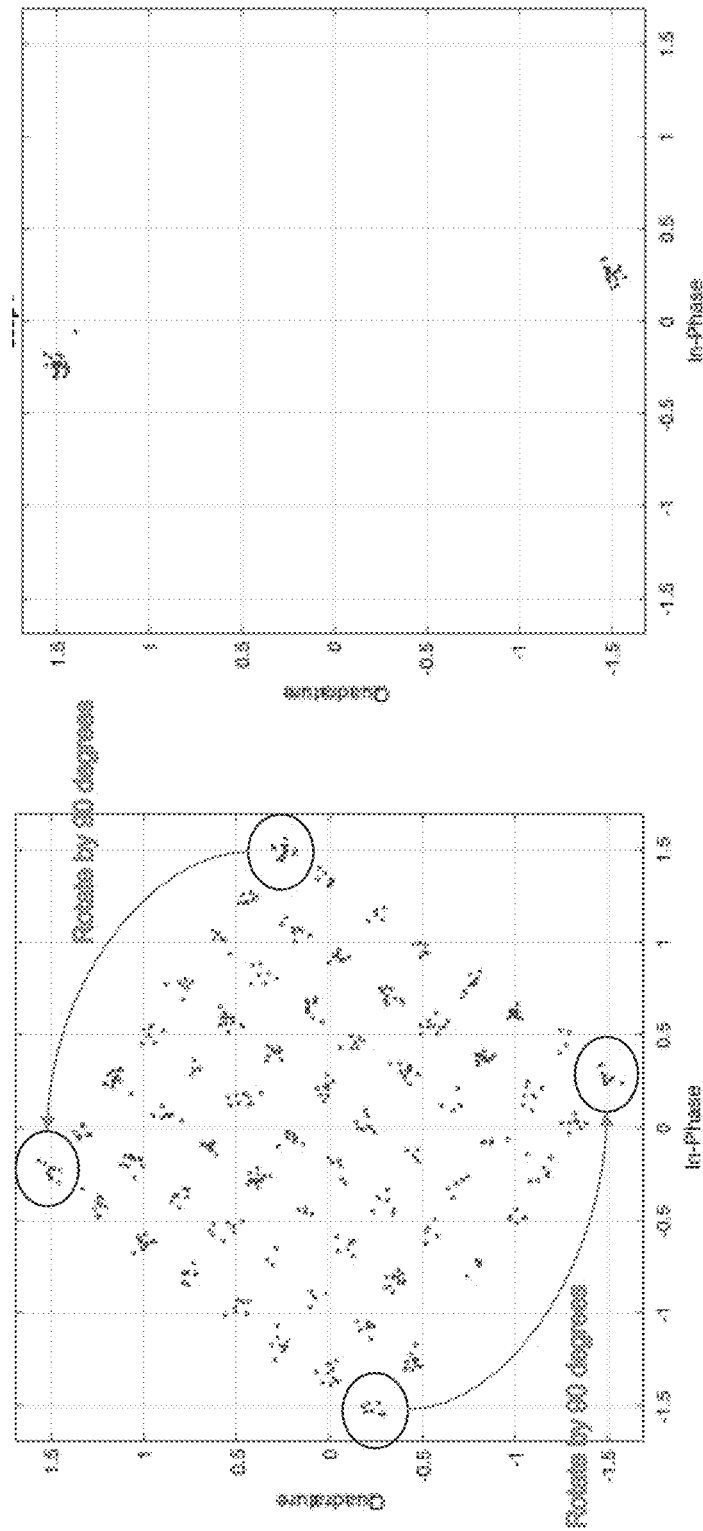

FIGS. 3B-3C are graphical representations of simulated in-phase vs. quadrature constellation data (intermediate stage) for the baseband signals of FIG. 3A. Here, the constellation for this data block is first rotated by a prescribed amount (e.g., π/4 radians or 45 degrees) as shown in FIG. 3B. Then, the corner points associated with the limit(s) (e.g., abs(in-phase)>hard_limit) are rotated by π/2 or 90 degrees. As a result, the data shown in FIG. 3C (right-hand panel) is produced. It will be recognized that in the foregoing process, the concatenation limits are applied so as to isolate and "superimpose" two of the corners of the constellation onto the other two corners, as shown in the right-hand panel of FIG. 3C. This approach greatly simplifies the amount of data that must be processed and utilized in the estimation of α as compared to prior art approaches such as Thomas, et al. In effect, a single calculation or iteration is performed to estimate the value of the residual rotation, which is then applied to de-rotate the entire constellation to correct for the phase noise. This provides, inter alia, both a good level of performance under various SNR conditions, as well as low complexity.

Figure 3D:
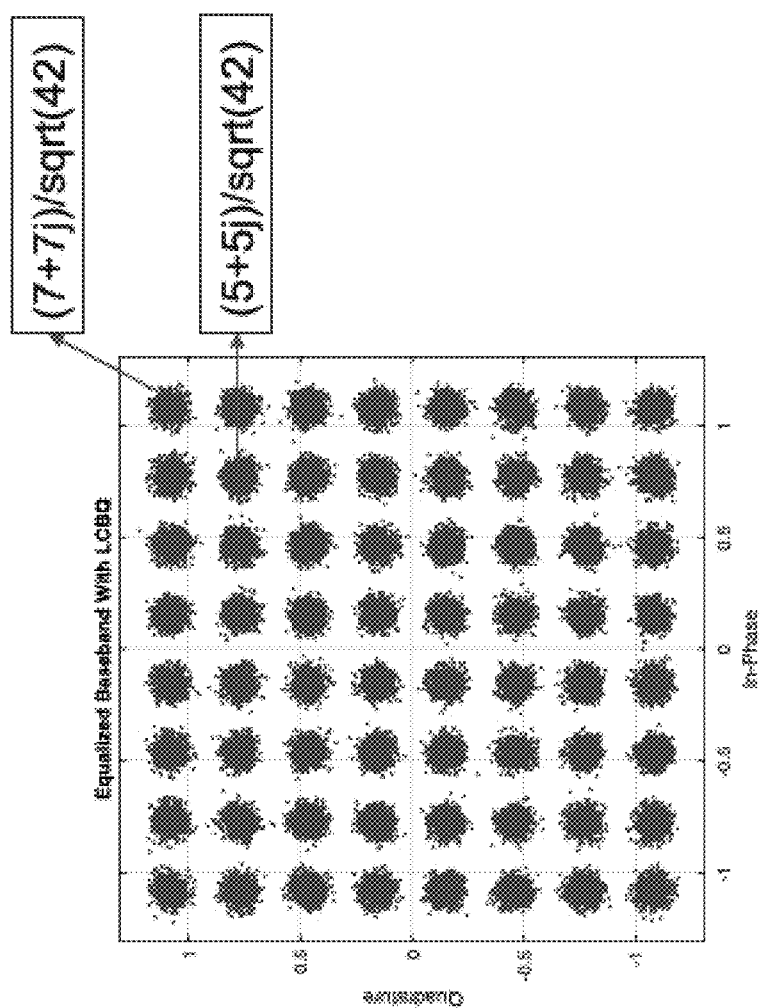
FIG. 3D is a graph showing the relationship of various points within the constellations of FIGS. 3B-3C.

As a brief aside, one ostensibly "ideal" location for a corner (e.g., the NE corner) of the 64-QAM constellation is located at (7+7j)/sqrt(42) (see FIG. 3D), and the adjacent constellation point is separated by 2/sqrt(42). Therefore, the mid-distance between 2 adjacent constellation point is 1/sqrt(42). Since the constellation is rotated by 45 degrees using the exemplary implementation of the LCBQ methodology described above, the distance from the origin to the NE corner of the constellation point is therefore the diagonal distance of the constellation point. Therefore, the limit used in the LCBQ algorithm for the 64-QAM modulation can be computed as below:

$$\text{limit} = \sqrt{2\left(\frac{7}{\sqrt{42}}\right)^2} - \frac{1}{\sqrt{42}} = 1.373 \qquad (4)$$

Table 1 below lists exemplary corner constellation points and distances of adjacent points as a function of exemplary modulation types.

TABLE 1

| Modulation Level | Corner Constellation Point | Distance to Adjacent Point |
|---|---|---|
| QPSK | (1 + 1j)/sqrt(2) | 2/sqrt(2) |
| 16-QAM | (3 + 3j )/sqrt(10) | 2/sqrt(10) |
| 64-QAM | (7 + 7j)/sqrt(42) | 2/sqrt(42) |
| 256-QAM | (15 + 15j)/sqrt(170) | 2/sqrt(170) |

Figure 2C:
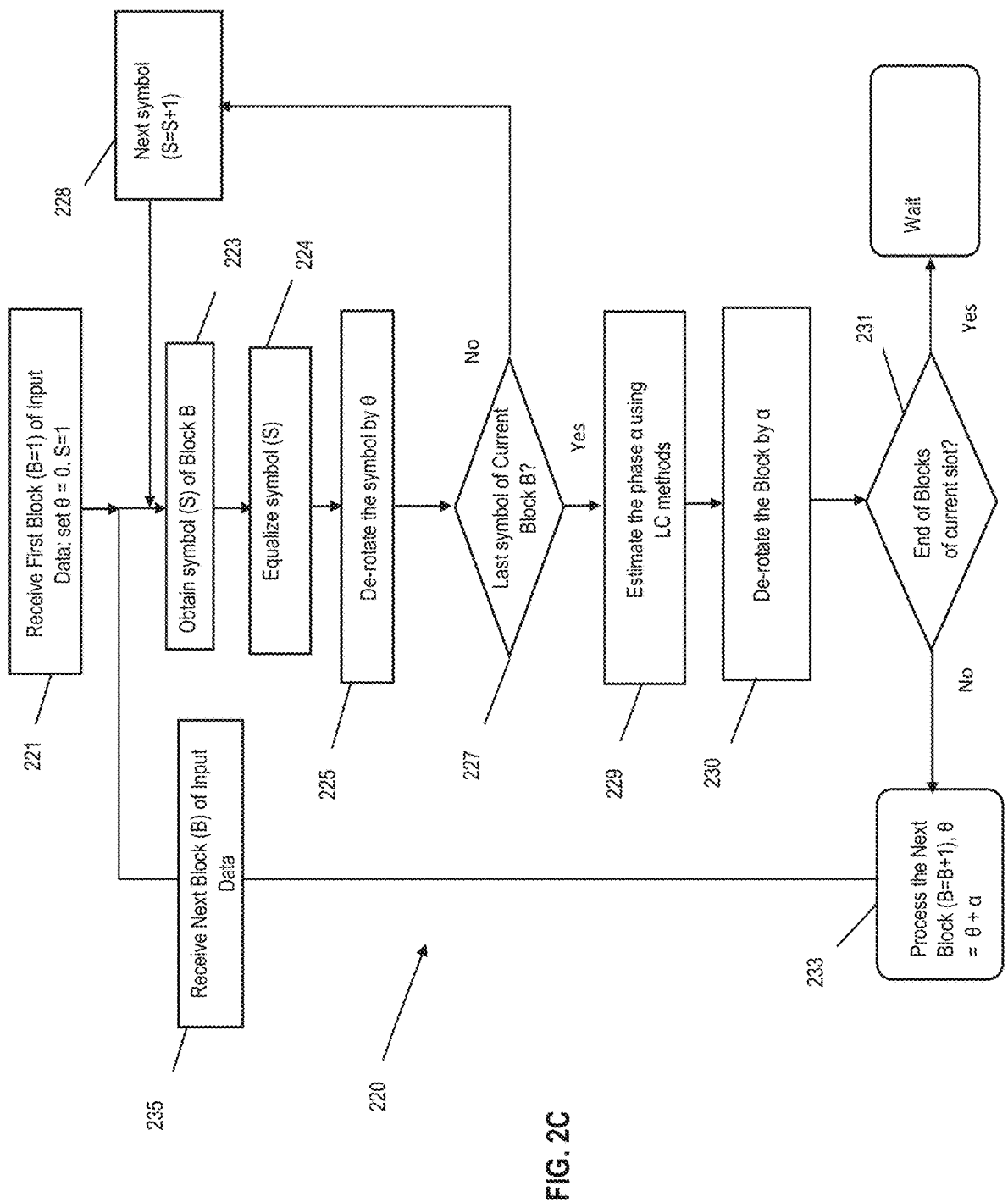
FIG. 2C is logic flow diagram illustrating a second exemplary embodiment of method for phase noise tracking and correction according to the present disclosure.

FIG. 2C illustrates another embodiment of the method of LCBQ-based phase noise compensation according to the disclosure.

Per step 221 of the method 220, a first block of input data (B=1) is received, and the value of θ is assigned a value of θ=0 for initialization. The value of the symbol index S is set to S=1.

Next, per step 223, the first symbol S (S=1) of the received block of input data is obtained and equalized by the equalizer on a symbol-by-symbol basis per steps 224 through 227, until all symbols within a given block B are equalized.

Next, per step 229 the de-rotated data is used to estimate the phase noise estimate α. As above, the low complexity (LC) methodology is applied in step 229 to determine the estimate of α.

At step 230, the block is de-rotated by the estimated phase α from step 229.

Next, per step 231, the method 220 checks if the last block of the current slot has been compensated. If not, the method proceeds to process the next block per step 233, and the latest value of α is used in determining the new value of θ (i.e., θ=θ+α).

It will also be appreciated that while certain embodiments described herein assume or implement phase noise tracking and correction on a block-by-block (B) basis, it is also possible to track and/or correct the phase noise based on other criteria; e.g., on a sub-block basis. For example, in one such approach, some fraction or increment of a given data block (B) could act as the basis for phase noise tracking/correction, such as where the phase noise algorithm is performed on one-half of a block such that a lesser number of samples/symbols are utilized to estimate the phase error. Such reduced-data approach may also be performed more frequently, such as at twice the "full block" frequency in the foregoing example of ½ block processing. As such, since less data is used to form the estimation (and subsequent correction), it will typically be less accurate than if a full block of data (i.e., all symbols therein) were utilized as previously described. However, such reduced-accuracy estimates can be generated more frequently if desired. This approach may be useful in, for instance, contexts where the phase noise is very large such that the phase error within a block is significant enough to cause higher bit error rate (BER). The BER data may also be used as a feedback for adjustment of the process (e.g., what fraction of each block is sampled/estimated, and/or how often such estimation is performed), similar to the approach of FIG. 2E discussed below.

It will also be appreciated that in cases of low phase noise (or low phase noise variation with time), subsets of either (i) the blocks (B) within a given slot, or (ii) the symbols (S) within a given block (B), may be used as the basis for phase noise correction. For instance, in one such approach, the algorithm is modified such that only every other block (B=1, B+2, B+4, . . . ) of data in the slot is selected for processing. As another example, only the first or last X number of the total number N of data blocks, or the middle X blocks of N, may be selected for processing. Similarly, only subsets of the symbols within a given block may be selected (whether or not all blocks of the current slot are processed or not).

Figure 2D:
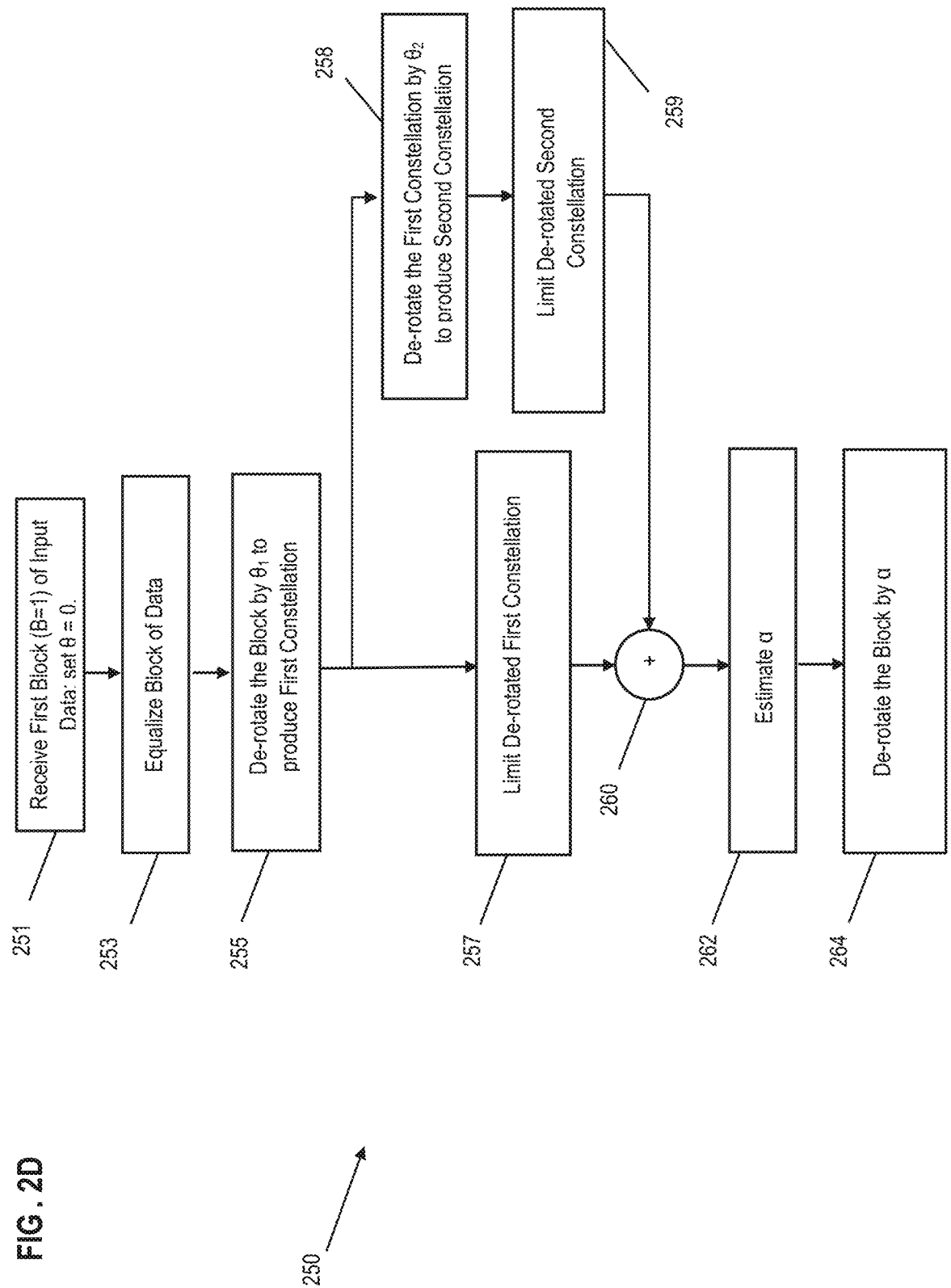
FIG. 2D is logic flow diagram illustrating a third exemplary embodiment of method for phase noise tracking and correction according to the present disclosure.

FIG. 2D illustrates yet another embodiment of the method of phase noise compensation according to the disclosure. In this method 250, a first block of input data (B=1) is received, and the value of θ is assigned a value of θ=0 for initialization (step 251).

Next, the received data block is equalized per step 253, and then de-rotated by a first value ($\theta_1$) per step 255 to produce a first constellation. This first constellation is limited according to one or more criteria per step 257. In parallel, the same data (first constellation) is de-rotated by a different value $\theta_2$ (e.g., 90 degrees) per step 258 and subsequently limited by one or more criteria per step 259. The two results are then added per step 260 to form a composite, spatially limited (e.g., corners only) constellation of symbol data which is then used as a basis for the residual error per step 262, which is ultimately applied per step 264 to the entire data block.

FIG. 2E illustrates one embodiment of a method for phase noise compensation according to the disclosure, wherein an index of iteration (N) is utilized to dynamically adjust for variations in error rate or MSE as a function of time/slot. As shown, the method 270 involves first receiving a TDM slot (step 271), and the first block B of that slot is obtained per step 273. Block B is equalized per step 275, and LCBQ compensation applied to the block as previously described herein (e.g., any of the methods of FIGS. 2A-2C) per step 277.

Per step 279, if the last block is not encountered, the process proceeds to step 281 wherein the block count (B) is incremented.

Upon encountering the last block at step 279, error data for the slot (or portions thereof, or even multiple slots) is obtained by the receiver per step 283.

Per step 285, the error data is evaluated (e.g., against a criterion) and if adjustment is needed to the index (N) (e.g., to add or reduce the number of iterations of the residual phase error (α) determination), then such adjustment is made per step 289, and the next queued slot received and processed with the adjusted index. Alternatively, if no adjustment is needed, then the method proceeds to step 271 and the next slot is processed without adjustment.

It will be appreciated that the methodology of FIG. 2E may be applied in different ways, such as where the default or "baseline" index value is always zero (i.e., no iterations, but rather just a single or one-step determination of a consistent with maintaining low computational complexity yet with good performance across the range of SNR), or where an alternate calculation or parameters are applied in a subsequent iteration (e.g., the first determination of a uses a first parameter set, and the second uses another, and so forth; e.g., where different de-rotation angles or ROIs of the constellation are utilized.) Yet other approaches will be recognized by those of ordinary skill given the present disclosure.

FIG. 4A is a graph of simulated performance (Estimation MSE vs. SNR) comparing prior art PLE and BQ methodologies to an exemplary embodiment of the LCBQ methodology of the present disclosure, for five (5) iterations. The MSE is computed for each algorithm and plotted. The BQ algorithm is an iterative algorithm, and in FIG. 4A, the number of iterations is set to 5. The results show that the LCBQ algorithm performs better than both PLE and BQ approaches under low SNRs (SNR<5 dB) and only slightly worse than BQ (but still better than PLE) under high SNR (SNR>15 dB) conditions, while having similar performance to the PLE and BQ approaches for SNR between 5-15 dB. It is noted that although the performance of the exemplary LCBQ algorithm is slightly worse than BQ above about 15 dB, the tradeoff is that the complexity of the implementation is significantly reduced over that of the BQ approach. In the exemplary case of 5G NR UE (e.g., handsets or other power-limited mobile devices such as tablets) utilizing a mmWave air interface, this reduced complexity may also translate to longer battery life due to reduced power consumption; stated differently, the more complex and processor-intensive the phase noise compensation algorithm is, the greater the power consumption.

Moreover, under higher SNR conditions (such as e.g., above 15 dB), the effect of phase noise may not be as significant as those under low SNR conditions); hence, the LCBQ algorithm in effect provides its optimization within what for many applications will be the "most important" range of SNR conditions (i.e., low and very low SNR conditions).

FIG. 4B is a graph of simulated performance (Estimation MSE vs. SNR) comparing prior art PLE and BQ methodologies to an exemplary embodiment of the LCBQ methodology of the present disclosure, for no (zero) iterations. FIG. 4B shows that the LCBQ algorithm performs significantly better than the BQ algorithm and the PLE algorithm at high SNR (i.e., above about 10 dB) and generally as good or better than both PLE and BQ at low SNR, while also reducing the computation complexity relative to the BQ algorithm. Hence, the LCBQ approach of the present disclosure is optimal in effectively all scenarios (with the BQ algorithm having only a slight edge in performance at high SNR when a high number of iterations are used).

Phase Noise Compensation Apparatus—

Referring now to FIGS. 5-5C, exemplary configurations of phase noise compensation apparatus according to the disclosure are shown and described.

FIG. 5 shows a block diagram of one embodiment of a 5G-NR receiver processing system 500 configured to operate in a mmWave frequency band. The received signal from the antenna(s) is down converted, filtered and converted by RF front end module 501. The analog down converted signal is converted from analog to digital by and Analog-to-Digital Converter (A/D) 502. The digital signal (data) are processed block-by-block by the baseband processor 503. The baseband processor (with LCBQ logic as described in greater detail below) 503 detects the transmitted data symbols and send them to the output. The RF front end module 501 may also include an RF impairment compensation module, carrier time frequency tracking loop, and out-of-band noise reduction modules. At digital baseband, the input to the baseband processor is modeled as:

$$y(n)=a(n)e^{j\alpha(n)} \quad (5)$$

where:

$\alpha(n)$ is the modulated data n is symbol number $\alpha(n)$ is phase noise at sample time n The phase noise $\alpha$ (n) can be modeled as a random time-varying phase.

The data symbols $\alpha(n)$ may be modulated according to one of the digital modulation schemes such as m-ary PSK (e.g. QPSK) or m-ary QAM (e.g. 16 QAM or 64 QAM). The modulation scheme may also vary from one symbol to another, or across different blocks. It will be appreciated, however, that the exemplary embodiments described herein are applicable only to modulation schemes that have a prescribed symmetry (e.g., square or rectangular), such as those listed above. However, the techniques and apparatus described herein may be readily adapted by those of ordinary skill given the present disclosure to other types of modulation schemes such as 32-ary QAM, based on their particular geometric or spatial considerations (whether symmetric or not), consistent with aims of reduced complexity and good performance as in the exemplary "symmetric" contexts described herein.

Figure 5A:
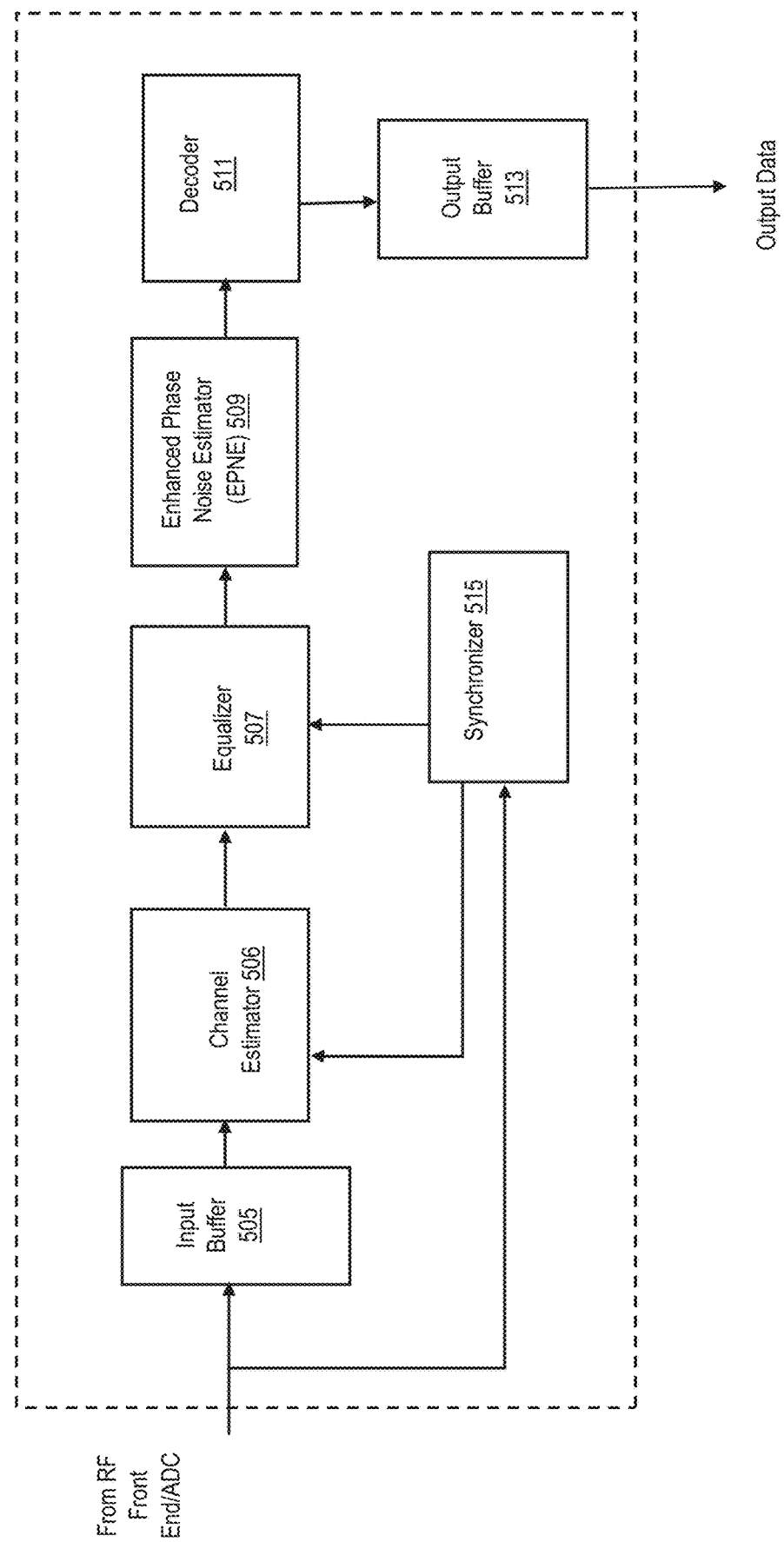
FIG. 5A is a block diagram illustrating one embodiment of a baseband processor with EPNE (enhanced phase noise estimator) useful within the apparatus of FIG. 5.

FIG. 5A shows a block diagram of the baseband processor 503 of FIG. 2. The data in digital format from the A/D converter output are fed to the input buffer 505. The input buffer 505 stores the incoming data symbols $\alpha(n)$. The data symbols stored in the input buffer are processed by the baseband processor 503, on a sequential (symbol-by-symbol, block-by-block) basis in the exemplary embodiment.

The synchronizer 515 estimates and corrects the time and frequency offsets. The frequency offset is caused by the difference between transmitter and receiver's local oscillator frequencies. The time offset is caused by the difference between the sampling phase of transmitter clock and receiver clock. The synchronization block 515 corrects the frequency and phase of the incoming data block so that the channel estimator 506 and equalizer 507 processes the compensated block of data. The synchronizer 515 may also include mechanisms for frame and time slot detection.

The channel estimator block 506 obtains an estimate of the channel response based on the reference symbols which are known to the receiver. Channel estimation is a critical task in wireless system. The channel estimation performance affects the performance of several blocks in a wireless receiver. The channel response is used by the equalizer 507 for the equalization. One scheme is to use Least-Square (LS) or Minimum-Mean-Square (MMSE) algorithms to implement the channel estimator.

The equalizer module 507 equalizes the received signal y(n). The wireless channel changes the amplitude and phase of the transmitted signal. The role of the equalizer 507 is to compensate the phase and amplitude of the received signal due to e.g., channel impairments. One implementation for equalizer 507 is a linear equalizer, although other approaches may be used.

The Enhanced Phase Noise Estimator (EPNE) 509 includes the LCBQ logic previously described, and in one embodiment is a blind phase noise estimator. The EPNE estimates the phase noise as previously discussed and applies the estimated phase noise to the received data block(s). Hence, the output data from EPNE has been compensated for the phase noise variation.

The decoder module 511 receives the data from the output of EPNE and decodes the transmitted bits. The module 511 may include a detector module such as Maximum-Likelihood, Sphere Decoder, Linear detector, and Forward Error Correction (FEC) Decoder, systematic (e.g., turbo) decoder, LDPC decoder or Maximum a Posteriori Decoder (MAP).

The output buffer 513 stores the received decoder output and stream the data to the end user bit-by-bit.

The components of the device 503 may be individually or partially implemented in software, firmware or hardware. For example, one or more elements of receiver 505 may be implemented in whole or in part as one or more set of instructions running on one or more programmable logic arrays such as microprocessor, digital signal processor, embedded processor, GPU, Field Programmable Gate Arrays (FPGA), ASICs (Application-Specific Integrated Circuits) or fixed arrays (e.g. transistors and gates).

Figure 5B:
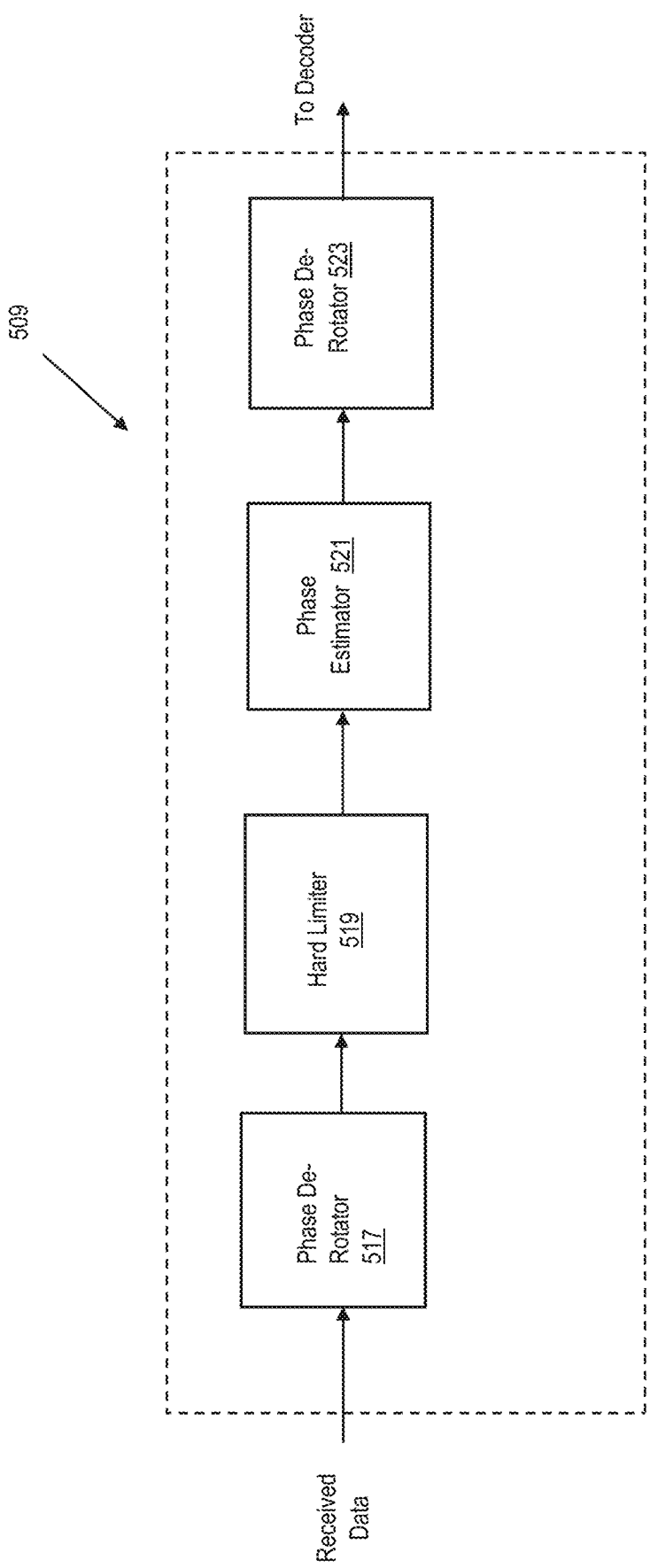
FIG. 5B is a block diagram illustrating one embodiment of the EPNE (enhanced phase noise estimator) of the apparatus of FIG. 5A.
Figure 5C:
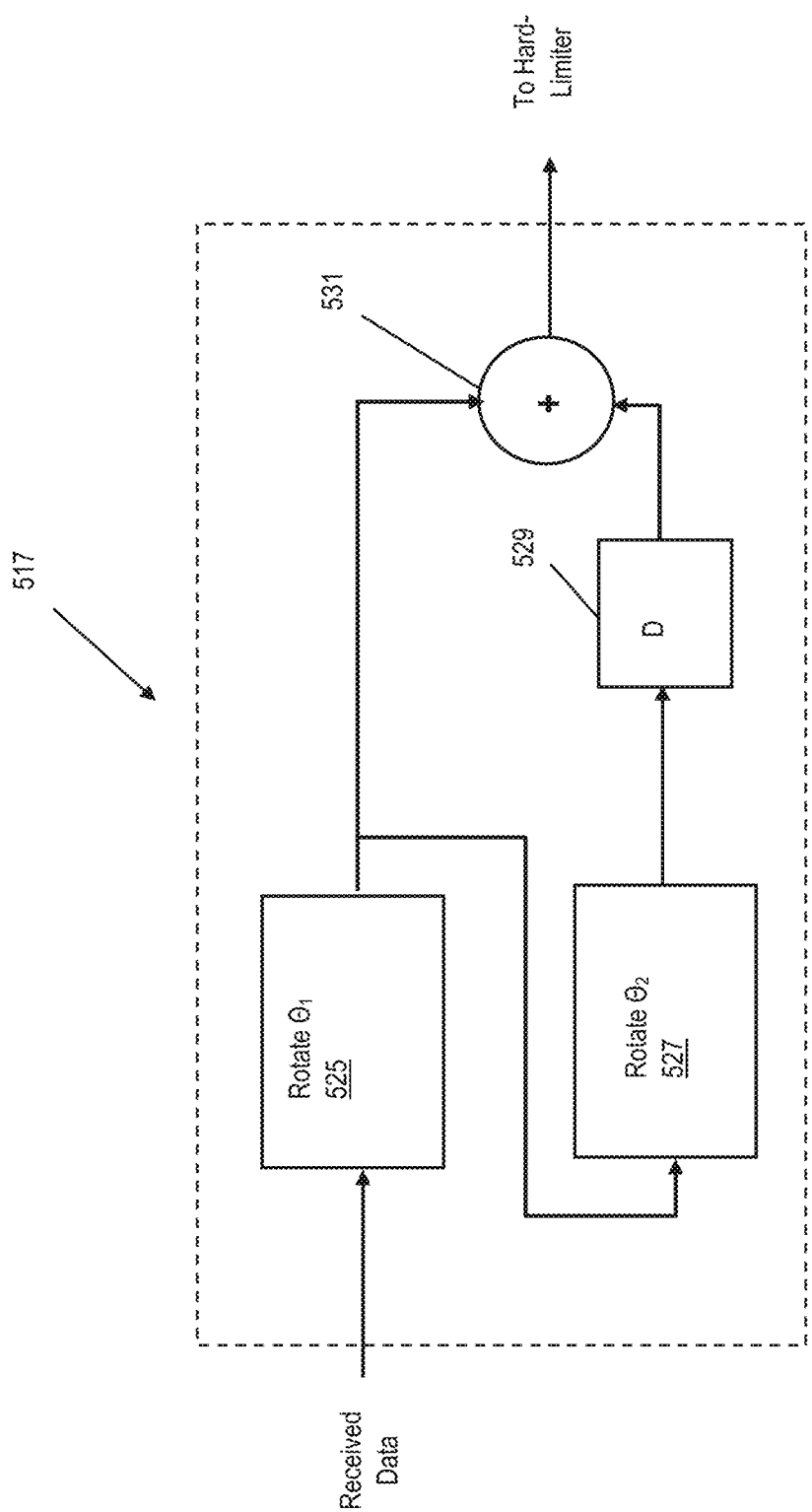
FIG. 5C is a block diagram illustrating one embodiment of the phase de-rotator of the exemplary EPNE of FIG. 5B.

FIG. 5B shows a block diagram of one configuration of the EPNE module 509 of FIG. 5A. The EPNE module 509 includes a first phase de-rotator 517, hard limiter 519, phase estimator 521, and a second phase de-rotator 523.

The first phase de-rotator 517 rotates the received data from the output of the equalizer r(n) for each block (or symbol in the block, depending on configuration) by an initial phase $\theta_0$, where:

$$x(n)=r(n)*e^{j\kappa 0} \quad (6)$$

The hard limiter 519 limits the outer constellation points above certain limits and creates a vector Z according to the following equation:

$$Z(n) = \begin{cases} x(n) \; imag(x(n)) > s \\ x(n) \; imag(x(n)) < -s \\ (x(n) \; real(x(n)) > s) * j \\ (x(n) \; real(x(n)) < -s) * j \end{cases} \quad (7)$$

The phase estimator 521 estimates the phase noise for each block as $$\hat{\alpha} = \frac{Z_I^T Z_R}{Z_R^T Z_R - Z_I^T Z_I} \quad (8)$$

where:

$\hat{\alpha}$ is the estimated phase noise for data block B $Z_R$ is the real part of vector Z $Z_I$ is the real part of vector Z $Z_T$ is the transpose matrix operation of Z As previously discussed, in one embodiment, the phase noise is assumed to be constant for the duration of any given block of data. The phase de-rotator 523 corrects the phase of data block using Eqn. (9)

$$Y=Y*e^{-j\hat{\alpha}} \quad (9)$$

The hard limiter 519 limits the outer constellation points e.g., above certain limits, and creates a vector of Z according to the above equation.

FIG. 5C shows a block diagram for an exemplary implementation for phase de-rotator block 517 useful with, for example, the embodiment of the methodology of FIG. 2D. In this implementation, the received data block is first rotated by $\theta_1$ in module 525, then the output of module 525 is rotated by $\theta_2$, and delayed by one symbol period at delay block 529. The outputs are combined at module 531, and the output is fed to the hard-limiter.

Exemplary mmWave System—

Figure 6:
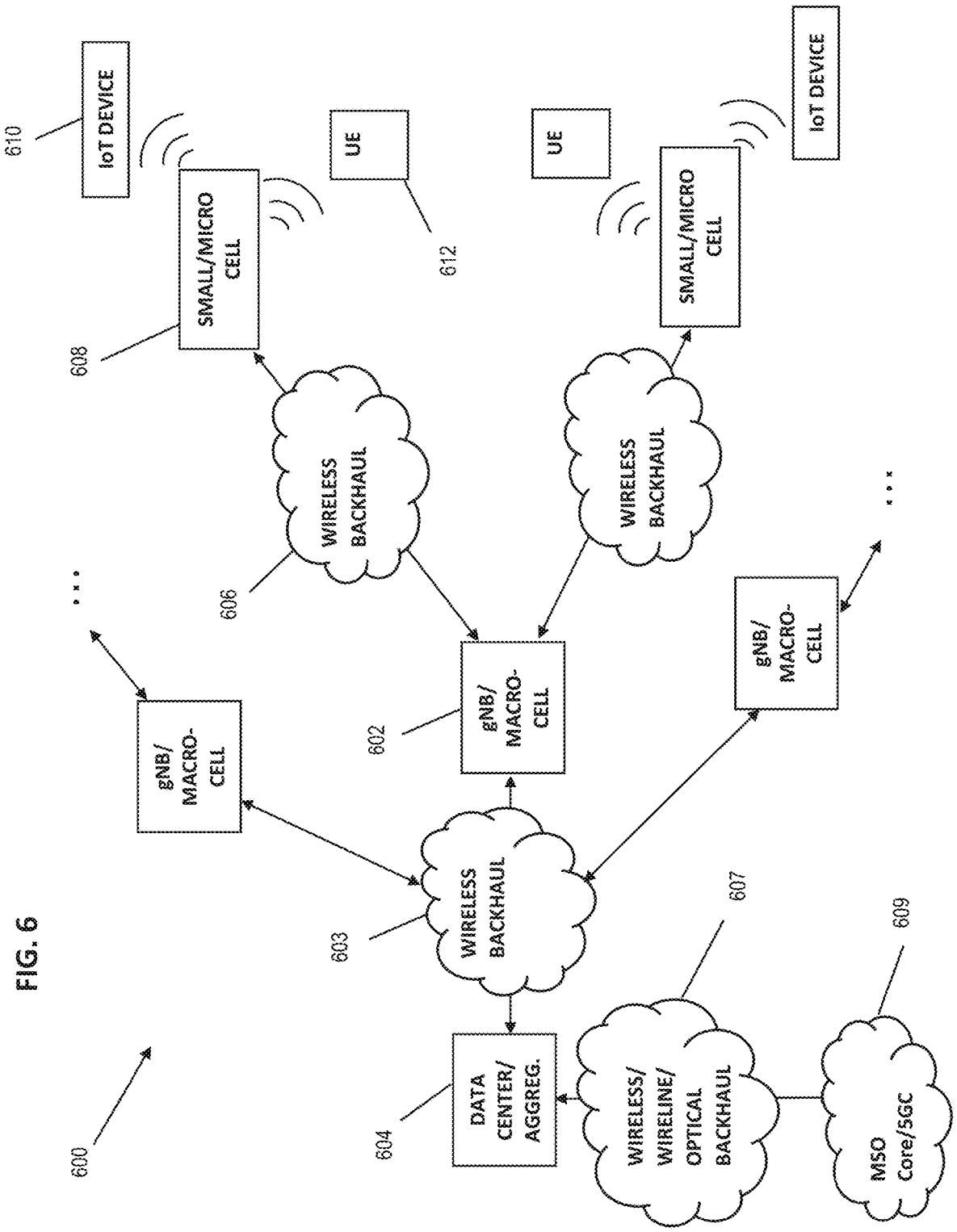
FIG. 6 is a functional block diagram illustrating one exemplary embodiment of a mmWave system architecture according to the present disclosure.

Referring now to FIG. 6, one exemplary embodiment of a mmWave-based system architecture utilizing the previously described improved methods and apparatus for phase noise compensation are shown and described. It will be appreciated that while a 3GPP-based 5G NR compliant system (e.g., NR-U) utilizing quasi-licensed or unlicensed spectrum in the mmWave band is shown and described, the phase noise compensation methodologies and apparatus of the present disclosure may be applied to other types of systems and other applications.

As shown in FIG. 6, the system architecture 600 generally includes a plurality of 3GPP macrocells (e.g., gNBs) 602, which are backhauled (e.g., wirelessly, including via mmWave technology) by a data center aggregator backhaul apparatus 604. For instance, in one embodiment, a plurality of gNBs 602 each communicate via respective mmWave backhaul direct links 603 to the aggregator apparatus 604, the latter which provides a centralized node for aggregating DL and UL traffic for the served gNBs (and their served small cells or microcells 608, discussed in greater detail below). It will be appreciated that the gNBs may also or alternatively be backhauled by optical or wireline technology, such as DWDM optical fiber or DOCSIS 3.1 or 4.0 cable modems with sufficient capacity to meet any requisite bandwidth and latency requirements.

Similarly, the data center/aggregator backhaul device 604 may be backhauled to an MSO core and/or 5GC 609 as shown via wireless, wireline or optical links 607 as shown.

The gNBs 602 of FIG. 6, as previously referenced, service a number of constituent small cells or micro-cells 608 via corresponding wireless backhauls 606, such backhauls 606 which may also comprise e.g., mmWave links. As discussed previously, mmWave band signals are readily attenuated by certain types of environments and objects, and generally rely primarily on direct LOS (line-of-sight) propagation paths. The strength of these signals tends to fall off rapidly as a function of range, and hence their use is often within more densely packed and spatially located environments such as densely populated urban areas, stadiums, indoors, and the like. As such, a number of such small- or micro-cells 608 (in effect, mmWave base stations) are typically deployed within a given area, with such small/micro-cells backhauled by macro-cells such as the gNBs 602 shown. The small/micro-cells provide highly localized coverage in the target areas, and can communicate with e.g., 3GPP 5G NR compliant UEs 612 (e.g., mobile devices) with sufficient mmWave air interfaces, as well as IoT devices 610.

Accordingly, it will be appreciated that the phase noise compensation techniques described herein may be utilized in literally any (or all) portions of the foregoing architecture where mmWave-band RF air interfaces or backhauls are utilized, such as between UE/IoT and micro-cell, between micro-cell and macro-cell, between macro-cell and backhaul aggregator, and between the aggregator and the core, depending on network topology and performance requirements.

Backhaul/Aggregator Apparatus—

Figure 7:
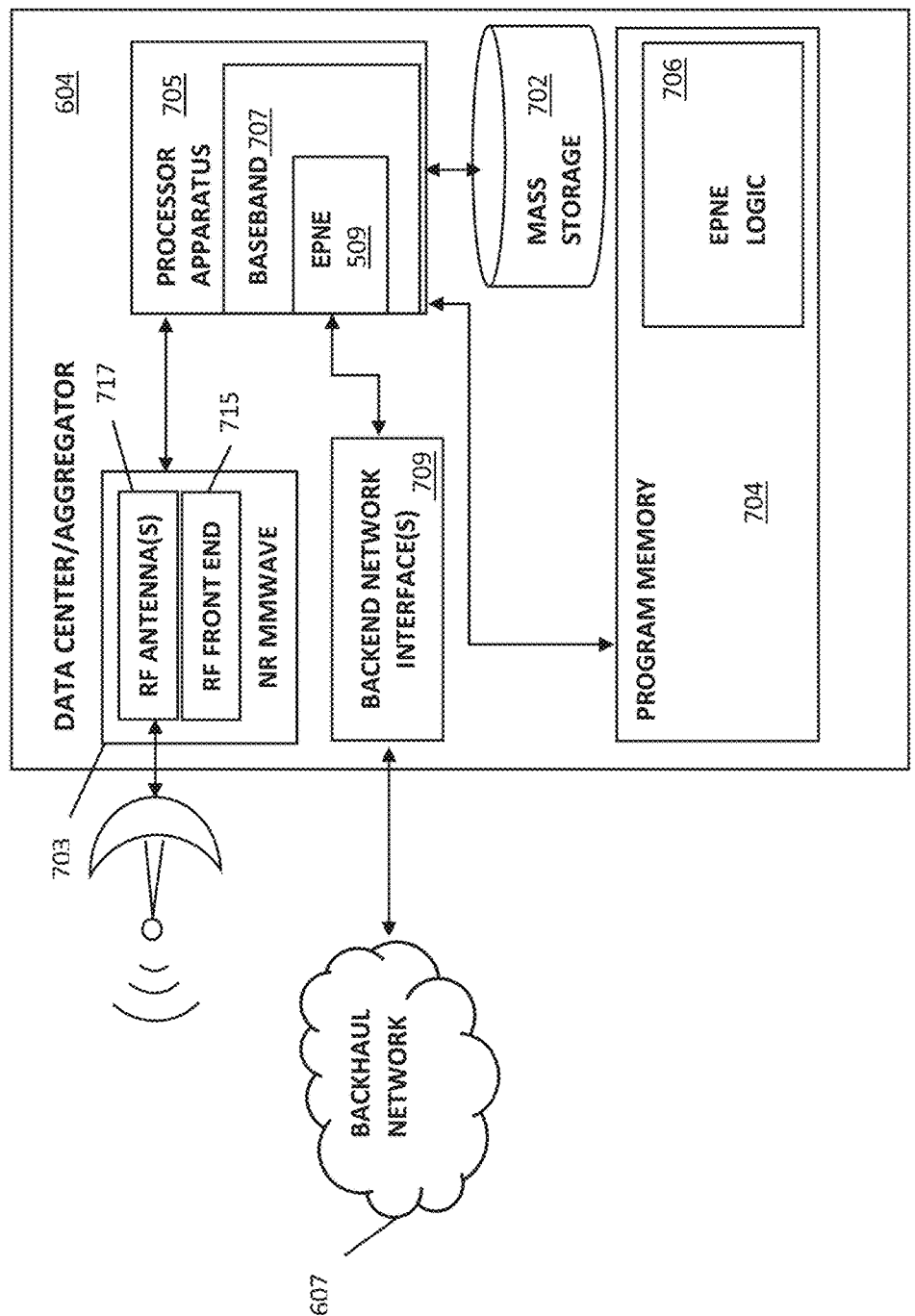
FIG. 7 is a functional block diagram illustrating an implementation of an LCBQ-enabled data center/aggregator apparatus according to the present disclosure.

FIG. 7 is a block diagram illustrating an exemplary embodiment of a backhaul aggregation apparatus configured with mmWave-band wireless interface(s), useful for operation in accordance with the present disclosure.

In one exemplary embodiment as shown, the CBSD/gNB includes, inter alia, a processor apparatus or subsystem 705, a program memory module 704, EPNE logic 706 (here implemented as software or firmware operative to execute on the processor 705), a local database 702, and mmWave wireless interfaces 703 for communications with the relevant gNBs, and/or other entities (e.g., on the backhaul to the core).

The 5G RF interface 703 may be configured to comply with the relevant PHY according to the relevant 3GPP NR standards which it supports (e.g., NR mmWave). The RF interface 703 may include an RF front end 715 (e.g., ADC/DAC, mixer, etc.), and the antenna(s) 719 of the radios of the aggregator may include parabolic/dish-type antenna elements, or multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

In one embodiment, the processor apparatus 705 may include one or more of a digital signal processor, microprocessor, field-programmable gate array, GPU, or plurality of processing components mounted on one or more substrates. The processor apparatus 705 may also comprise an internal cache memory, and a modem. In addition, the processor 705 includes an EPNE of the type previously described herein with respect to FIGS. 5-5C. In one example, the EPNE module with LCBQ algorithms maybe implemented as software or firmware stored on a storage device and executed on the processor 705.

The processing subsystem 705 is in communication with a program memory module or subsystem 704, where the latter may include memory which may comprise, e.g., SRAM, flash and/or SDRAM (e.g., GDDR5 or GDDR6) components. The memory module 704 may implement one or more of direct memory access (DMA) type hardware, so as to facilitate data accesses as is well known in the art. The memory module of the exemplary embodiment contains one or more computer-executable instructions that are executable by the processor apparatus 705. A mass storage device (e.g., HDD or SSD, or NAND/NOR flash or the like) is also provided as shown.

The processor apparatus 705 is configured to execute at least one computer program stored in memory 704 (e.g., the logic of the EPNE module according to the methods of FIGS. 2A-2C herein, in the form of software or firmware that implements the various functions). Other embodiments may implement such functionality within dedicated hardware, logic, and/or specialized co-processors (not shown). In some embodiments, the logic 706 also utilizes memory 704 or other storage 702 configured to temporarily and/or locally hold a number of data relating to the various associations for the various gNBs 602 which the apparatus 604 services under the NR standard(s). In other embodiments, application program interfaces (APIs) may also reside in the internal cache or other memory 704. Such APIs may include common network protocols or programming languages configured to enable communication between with other network entities (e.g., via API "calls" to or from the NG core 609).

Wireless Access Node Apparatus—

Figure 8:
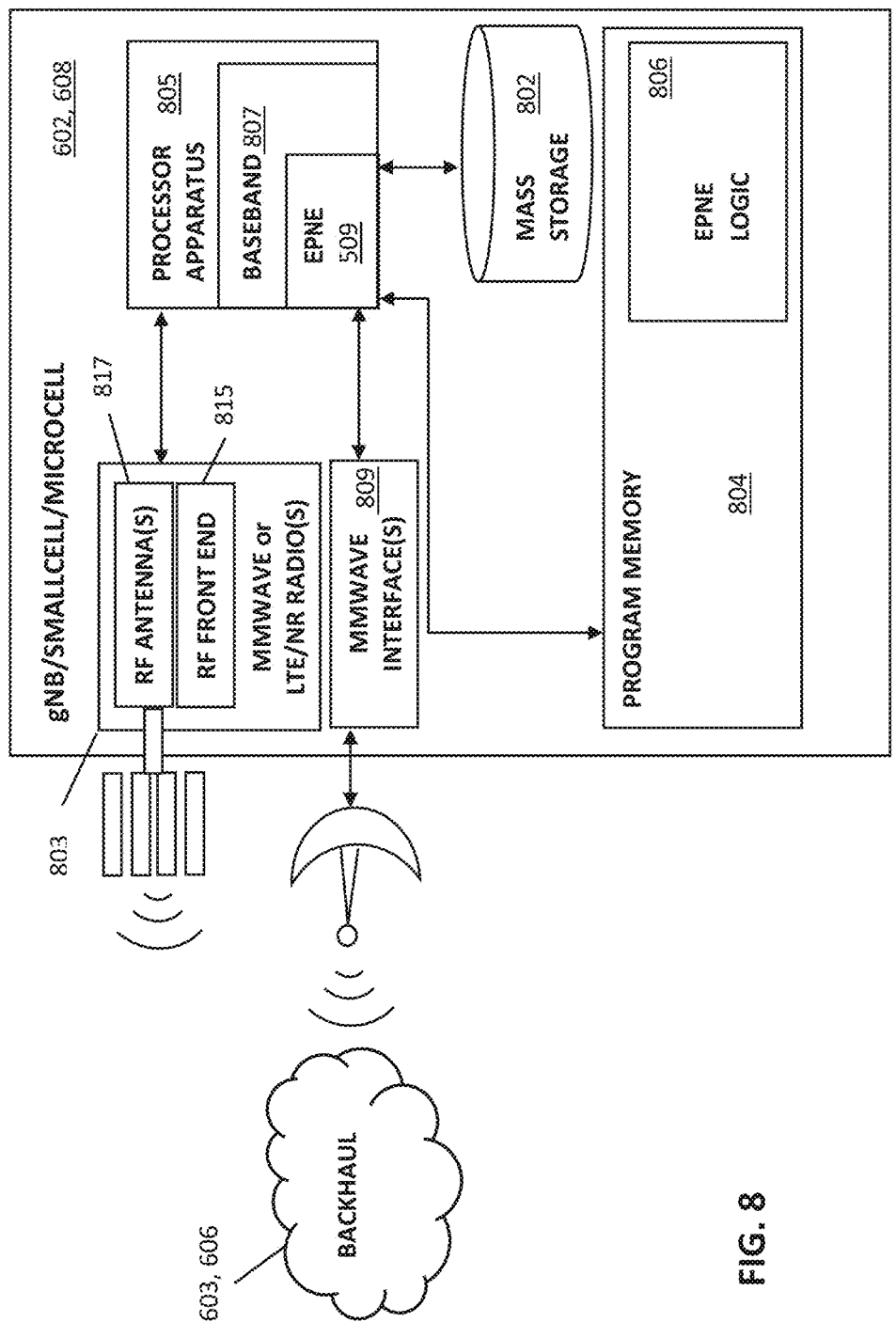
FIG. 8 is a functional block diagram illustrating an implementation of an LCBQ-enabled mmWave base station apparatus (e.g., 3GPP gNB, small cell, or micro-cell) according to the present disclosure.

FIG. 8 illustrates a block diagram of an exemplary embodiment of a generalized gNB apparatus 602, useful for operation in accordance with the present disclosure.

In one exemplary embodiment as shown, the gNB includes, inter alia, a processor apparatus or subsystem 805, a program memory module 804, EPNE logic 806 in support of both front-haul links to the small-cells/micro-cells, and backhauls to the network aggregator 604 is used (here implemented as software or firmware operative to execute on the processor 805), a local database 802, and front end wireless interface(s) 803 for communications with the relevant small/micro-cells. A backhaul interface 809 is also shown, which may also utilize mmWave including the EPNE logic previously described.

The 5G RF front-end interface 803 may be configured to comply with the relevant PHY according to the relevant 3GPP NR standards which it supports. The RF front end 815 may be configured to support mmWave frequencies (e.g., via a superheterodyne or other approach), and the antenna(s) 817 of the radios of the gNB(s) may include multiple spatially diverse individual elements in e.g., parabolic dish, or a MIMO- or MISO-type configuration, such that spatial diversity of the received signals can be utilized. As above, a phased array or similar arrangement can be used for spatial resolution within the environment, such as based on time delays associated with signals received by respective elements. Beamforming and "massive MIMO" may also be utilized within the logic of the gNB in support of e.g., the front-end interfaces 803.

In one embodiment, the processor apparatus 805 may include one or more of a digital signal processor, microprocessor, field-programmable gate array, GPU, or plurality of processing components mounted on one or more substrates. The processor apparatus 805 may also comprise an internal cache memory, and a modem. In addition, the processor 805 includes an EPNE of the type previously described. The processing subsystem 805 is in communication with a program memory module or subsystem 804, where the latter may include memory which may comprise, e.g., SRAM, flash and/or SDRAM (e.g., GDDR5 or GDDR6) components. The memory module 804 may implement one or more of direct memory access (DMA) type hardware, so as to facilitate data accesses as is well known in the art. The memory module of the exemplary embodiment contains one or more computer-executable instructions that are executable by the processor apparatus 805. A mass storage device (e.g., HDD or SSD, or NAND/NOR flash or the like) is also provided as shown.

The processor apparatus 805 is configured to execute at least one computer program stored in memory 804 (e.g., the logic of the EPNE module according to the methods of FIGS. 2A-2C herein, in the form of software or firmware that implements the various functions). Other embodiments may implement such functionality within dedicated hardware, logic, and/or specialized co-processors (not shown).

In some embodiments, the logic 806 also utilizes memory 804 or other storage 802 configured to temporarily and/or locally hold a number of data relating to the various associations for the various small-cells or micro-cells (or even mmWave-enabled UE) which it services under the NR standard(s). In other embodiments, application program interfaces (APIs) may also reside in the internal cache or other memory 804, to enable communication between with other network entities (e.g., via API "calls" to or from the NG core 609 or the aggregator 604).

User Device—

Figure 9:
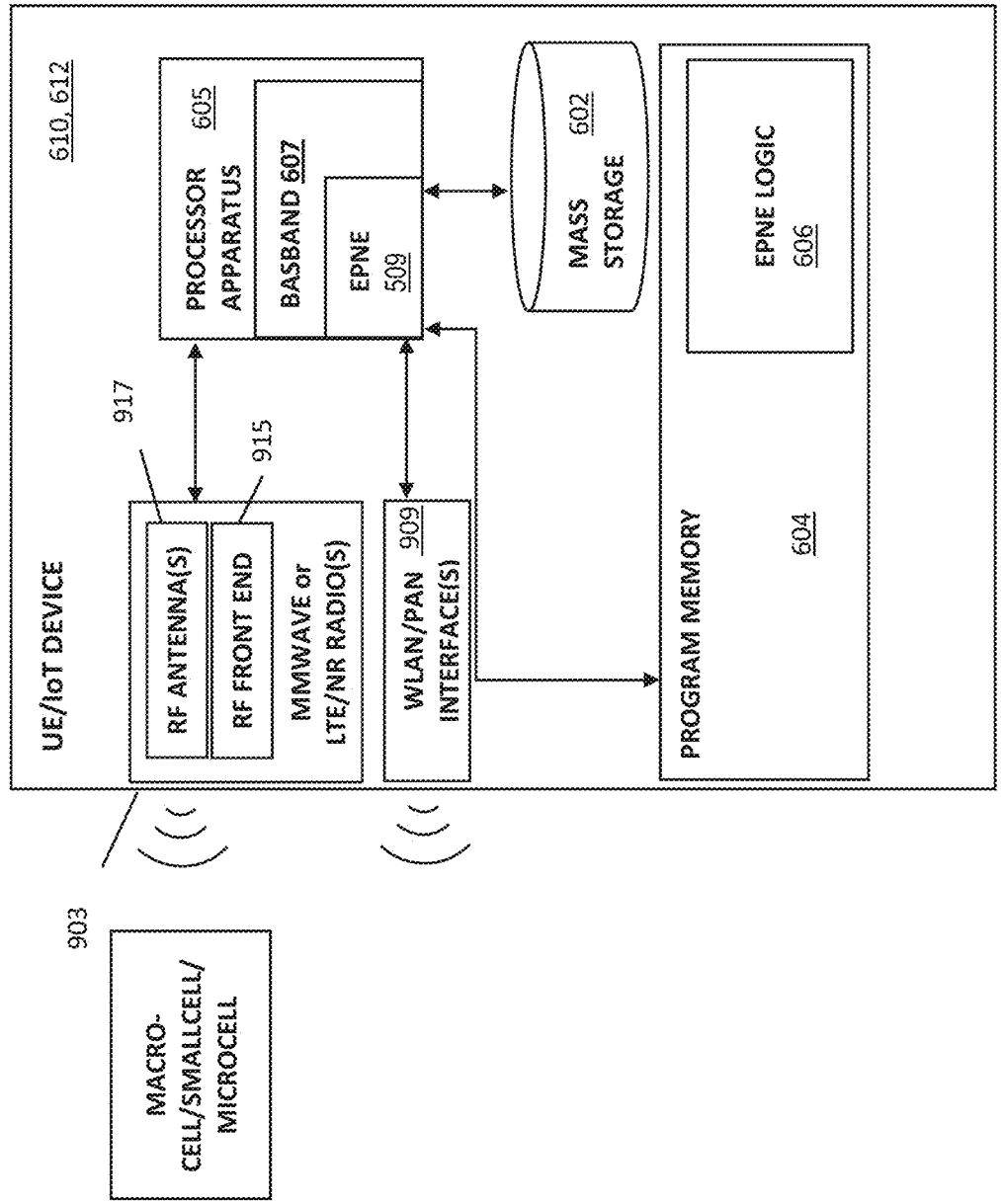
FIG. 9 is a functional block diagram illustrating an implementation of an LCBQ-enabled user device (e.g., 3GPP UE, or IoT device) according to the present disclosure.

FIG. 9 illustrates a block diagram of an exemplary embodiment of an enhanced user device such as a 3GPP UE or IoT device equipped for mmWave communication, useful for operation in accordance with the present disclosure.

In one exemplary embodiment as shown, the UE 610 or IoT device 612 includes, inter alia, a processor apparatus or subsystem 905, a program memory module 906, EPNE logic 906 (here also implemented as software or firmware operative to execute on the processor 905), and wireless interfaces 903, 909 for communications with the relevant RANs (e.g., 5G-NR RAN, IEEE Std. 802.11ad, IEEE Std. 802.15.4) and local PAN/WLAN devices, respectively. The RF interfaces 903, 909 are each configured to comply with the relevant PHY standards which it supports, and include an RF front end 915 and antenna(s) elements 917 of the UE or IoT device radios may include multiple spatially diverse individual elements in e.g., a MIMO- or MISO-type configuration, such that spatial diversity of the received signals can be utilized. For example, an exemplary Qualcomm QTM052 mmWave antenna module may be used within the UE/IoT device for mmWave reception and transmission. Beamforming and "massive MIMO" may also be utilized within the logic of the UE/IoT device in support of e.g., the front-end and backend interfaces 903, 909.

In one embodiment, the processor apparatus 805 may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure.

The processor apparatus 905 may also comprise an internal cache memory, and a modem. As indicated, the UE includes an ENPE module 509 on the program memory which is in communication with the processing subsystem, where the former may include memory which may comprise, e.g., SRAM, flash and/or SDRAM components. The memory module 904 may implement one or more of direct memory access (DMA) type hardware, so as to facilitate data accesses as is well known in the art. The memory module of the exemplary embodiment contains one or more computer-executable instructions that are executable by the processor apparatus 905. A mass storage device (e.g., HDD or SSD, or NAND/NOR flash or the like, such as via eMCC) is also provided as shown.

Other embodiments may implement the EPNE functionality within dedicated hardware, logic, and/or specialized co-processors (not shown).

As noted, the UE/IoT device 610, 612 may include an EPNE module 509 which is configured to determine estimate and correct the phase noise. In one embodiment, the EPNE module is integrated with the baseband processor 907 (via its execution on the processor). The baseband processor processes the baseband control and data signals for transmission and reception in the RF frond end module 903 and/or the backend interfaces 909.

In some embodiments, the UE also utilizes memory 904 or other storage 902 configured to temporarily hold a number of data relating to the various network associations (e.g., to micro-cells, gNBs, etc.), and for the various services/applications such as voice, etc.) for the various functions described herein.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method for correcting phase error in a received signal, comprising:
    receiving symbols of an input data block comprising a first data symbol and a last data symbol;
    applying an equalization process to the symbols starting with the first data symbol to produce an equalized block of input data symbols;
    de-rotating the equalized block of the input data symbols using a first value;
    estimating second value for the equalized block of the input data symbols using an LCBQ (low complexity blind-QAM) based algorithm; and
    applying a phase error compensation to the equalized block of input symbols based at least in part on the estimated second value.

2. The computerized method of claim 1, wherein the estimating the second value comprises estimating the second value based at least on a concatenation of at least a portion of points of a constellation formed by individual ones of the symbols of the input data block which exceed a prescribed limit.

3. The computerized method of claim 2, further comprising selecting the at least portion of points of the constellation based at least in part on a specific Cartesian coordinate area of the constellation.

4. The computerized method of claim 1, further comprising applying the second value as part of estimating a phase error compensation for a subsequent input data block, the input data block and the subsequent input data block each being part of a TDM (time division multiplexed) slot data structure.

5. The computerized method of claim 1, wherein the receiving the symbols of the input data block comprises receiving the input data block over a physical channel, the physical channel comprising a wireless channel having a carrier frequency within a mmWave band.

6. A computerized apparatus for use in a wireless infrastructure, the computerized apparatus comprising:
    digital processing apparatus;
    an equalization apparatus in data communication with the digital processing apparatus;
    at least one wireless interface in data communication with the digital processing apparatus, the at least one wireless interface operative to utilize a mmWave radio frequency (RF) band for communication of data; and
    a storage device in data communication with the digital processing apparatus, the storage device comprising a storage medium having at least one computer program, the at least one computer program configured to, when executed on the digital processing apparatus, cause the computerized apparatus to:
        apply a non-iterative phase noise compensation algorithm for at least reception of the data;
    wherein:
        the non-iterative phase noise compensation algorithm is applied after equalization by the equalization apparatus; and
        the non-iterative phase noise compensation algorithm is configured to: (i) perform a de-rotation before the equalization, and estimate a second de-rotation based at least on a subset of constellation points associated with the data, the estimate occurring without further iteration.

7. The computerized apparatus of claim 6, wherein the computerized apparatus further comprises a 3rd Generation Partnership Project (3GPP) Fifth Generation New Radio Unlicensed (5G NR-U) capable gNodeB.

8. The computerized apparatus of claim 6, wherein the computerized apparatus comprises a Fifth Generation New Radio (5G NR) capable UE (user equipment).

9. The computerized apparatus of claim 6, wherein the subset of the constellation points associated with the data is selected based on a plurality of spatial limit criteria.

10. The computerized apparatus of claim 9, wherein the subset comprises only corners of a constellation.

11. The computerized apparatus of claim 6, wherein the subset of constellation points associated with the data is selected based at least in part on a specific Cartesian coordinate area of a constellation.

12. The computerized apparatus of claim 6, wherein the estimation of the second de-rotation is based at least on a concatenation of the subset of the constellation points formed by symbols of an input data block which exceed a prescribed limit.

13. Computer readable apparatus comprising a non-transitory storage medium, the non-transitory storage medium comprising at least one computer program, the at least one computer program comprising a plurality of instructions which are configured to, when executed on a processing device, cause compensation for phase noise within a wireless device by at least:
    receipt of a slot comprising a plurality of data blocks;
    equalization of at least a first data block of the plurality of data blocks to produce an uncompensated but equalized constellation for the first data block;
    application of at least one (i) a rotation or (ii) a spatial limitation to the uncompensated but equalized constellation;
    execution of a low complexity blind-QAM (LCBQ) algorithm to estimate, based on the at least one (i) the rotation or (ii) the spatial limitation, a residual phase noise error parameter; and
    utilization of at least the estimated residual phase noise error parameter to apply a compensation to the first data block;
    wherein the LCBQ algorithm is configured to enable selective tradeoff between at least implementation complexity and performance.

14. The computer readable apparatus of claim 13, wherein the plurality of instructions are further configured to, when executed on the processing device, cause the compensation for the phase noise within the wireless device by at least:

a determination of an initial rotation value for one of the plurality of data blocks within a slot subsequent to the first data block via the utilization of the estimated residual phase noise error parameter.

15. The computer readable apparatus of claim 14, wherein:

the plurality of data blocks have been modulated according to a symmetric modulation scheme; and the application of the at least one of the (i) rotation or (ii) the at least one spatial limitation to the uncompensated but equalized constellation comprises (i) application of a rotation angle that is configured to utilize a symmetry of the uncompensated but equalized constellation, and (ii) utilization of at least one spatial limitation that eliminates at least a majority of the data of the uncompensated but equalized constellation prior to the estimation of the residual phase noise error parameter.

16. The computer readable apparatus of claim 15, wherein the estimation of the residual phase noise error parameter comprises estimation of a second rotation angle.

17. The computer readable apparatus of claim 13, wherein the selective tradeoff comprises at least a user-selectable degree of trade-off via at least one of a software configuration or firmware configuration.

18. The computer readable apparatus of claim 13, wherein the selective tradeoff is dynamically variable and controlled via one or more machine-based algorithms that are self-optimizing based on one or more operating environment conditions.

19. The computer readable apparatus of claim 18, wherein the one or more operating environment conditions comprise an element of weather.

20. The computer readable apparatus of claim 13, wherein the computer readable apparatus is configured to be executed in a wireless apparatus having an air interface, the wireless apparatus comprising one of (i) a computerized user device, (ii) a small cell, or (iii) a microcell.

* * * * *

UNITED STATES PATENT AND TRADEMARK OFFICE
CERTIFICATE OF CORRECTION

| | |
|---|---|
| PATENT NO. | : 11,581,911 B2 |
| APPLICATION NO. | : 16/666255 |
| DATED | : February 14, 2023 |
| INVENTOR(S) | : Yohannes S. Solichien |

It is certified that error appears in the above-identified patent and that said Letters Patent is hereby corrected as shown below:

In the Claims (Column 24, Lines 42 – 65 – Claim 13):
Currently Reads:
"Computer readable apparatus comprising a non-transitory storage medium, the non-transitory storage medium comprising at least one computer program, the at least one computer program comprising a plurality of instructions which are configured to, when executed on a processing device, cause compensation for phase noise within a wireless device by at least: receipt of a slot comprising a plurality of data blocks;
equalization of at least a first data block of the plurality of data blocks to produce an uncompensated but equalized constellation for the first data block; application of at least one (i) a rotation or (ii) a spatial limitation to the uncompensated but equalized constellation; execution of a low complexity blind-QAM (LCBQ) algorithm to estimate, based on the at least one (i) the rotation or (ii) the spatial limitation, a residual phase noise error parameter; and utilization of at least the estimated residual phase noise error parameter to apply a compensation to the first data block; wherein the LCBQ algorithm is configured to enable selective tradeoff between at least implementation complexity and performance."

Should Read:
-- Computer readable apparatus comprising a non-transitory storage medium, the non-transitory storage medium comprising at least one computer program, the at least one computer program comprising a plurality of instructions which are configured to, when executed on a processing device, cause compensation for phase noise within a wireless device by at least: receipt of a slot comprising a plurality of data blocks;
equalization of at least a first data block of the plurality of data blocks to produce an uncompensated but equalized constellation for the first data block; application of at least one (i) a rotation or (ii) a spatial limitation to the uncompensated but equalized constellation; execution of a low complexity blind-QAM (LCBQ) algorithm to estimate, based on the at least one (i) the rotation or (ii) the spatial limitation, a residual phase noise error parameter; and utilization of at least the estimated residual Signed and Sealed this
Thirteenth Day of August, 2024

Katherine Kelly Vidal
*Director of the United States Patent and Trademark Office* phase noise error parameter to apply a compensation to the first data block; wherein the LCBQ algorithm is configured to enable selective tradeoff between at least implementation of complexity and performance. --